(12) United States Patent
Ogawa

(10) Patent No.: US 6,487,175 B1
(45) Date of Patent: Nov. 26, 2002

(54) CONTROL OF POWER SUPPLY TO SUBCRIBERS IN DIGITAL SWITCH BOARD WITH RESPECT TO DATA-COMMUNICATION CALLS

(75) Inventor: Yasunori Ogawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/139,083

(22) Filed: Aug. 24, 1998

(30) Foreign Application Priority Data

Mar. 10, 1998 (JP) .......................................... 10-057725

(51) Int. Cl.[7] .................................................. H04J 1/16
(52) U.S. Cl. ........................ 370/252; 370/271; 379/323; 713/320
(58) Field of Search ..................... 235/472.01; 375/222; 345/327; 455/466, 403, 3.3; 363/21.11, 93.07; 379/93.14, 265, 106.09, 106, 373.01, 399, 322–324; 370/352, 264, 201, 401, 493, 356, 252, 295, 271, 386; 713/200, 300–340; 463/41; 600/300

(56) References Cited

U.S. PATENT DOCUMENTS

| 4,475,193 A | * | 10/1984 | Brown | ........................ 370/295 |
|---|---|---|---|---|
| 4,484,028 A | * | 11/1984 | Kelley et al. | ............. 379/93.14 |
| 5,289,359 A | * | 2/1994 | Ziermann | ................. 363/21.11 |
| 5,715,296 A | * | 2/1998 | Schornack et al. | .......... 455/403 |
| 5,905,781 A | * | 5/1999 | McHale et al. | ........... 379/93.14 |
| 6,084,583 A | * | 7/2000 | Gerszberg et al. | ........... 345/327 |
| 6,089,456 A | * | 7/2000 | Walsh et al. | ............ 235/472.01 |
| 6,198,816 B1 | * | 3/2001 | Hein et al. | .............. 379/373.01 |

FOREIGN PATENT DOCUMENTS

JP  60-212059  10/1985

* cited by examiner

*Primary Examiner*—Hassan Kizou
*Assistant Examiner*—John Pezzlo
(74) *Attorney, Agent, or Firm*—Katten Muchin Zavis Rosenman

(57) ABSTRACT

A device for controlling power supply to subscribers in a digital subscriber-switch board includes subscriber-line circuits which supply power to the subscribers, and a carrier-detection unit which is connected to a communication path to detect a carrier signal of a modem once the communication path is established between a caller and a receiver, the caller being one of the subscribers, wherein one of the subscriber-line circuits corresponding to the one of the subscribers is controlled to suspend power supply to the one of the subscribers when the carrier-detection unit detects the carrier signal on the communication path.

16 Claims, 24 Drawing Sheets

CONTROL OF POWER SUPPLY TO SUBCRIBERS IN DIGITAL SWITCH BOARD WITH RESPECT TO DATA-COMMUNICATION CALLS

BACKGROUND OF THE INVENTION

1. Field of the Invention

The present invention relates to subscriber-power-supply-control devices and subscriber-line circuits which are used along with a subscriber switch board for handling voice calls as well as internet calls.

2. Description of the Related Art

FIG. 1 is a block diagram showing a system configuration in which personal computers ;are accommodated via a digital-subscriber-switch board where the digital-subscriber-switch board generally deals with voice calls. The subscriber-switch board mainly includes a switch unit 1 and a central-control device 4, and accommodates conventional analog telephones TEL and modems of personal computers PC via subscriber-line circuits 2. Further, the subscriber-switch board accommodates modems belonging to computer-communication-service providers such as internet providers via a digital trunk 3. A power-supply device 7 is used for supplying power to the subscriber-switch board, and is also used for supplying power to subscriber-line circuits 2 and thence to the analog telephones.

In subscriber-switch boards handling voice calls, it is necessary to supply power to analog telephones. A direct current supplied to each analog telephone is used for detecting a start and an end of a call, and, also, is used for a voice/electric-current conversion in the telephone device. A typical level of power supply during a call is about 2 W (per each telephone) on average. In the case of an office-switch board servicing to more than ten thousand subscribers, for example, a total amount of supplied power reaches an enormous level, so that the power-supply device 7 needs to have a large capacity accordingly. Such a power-supply device 7 becomes an undesirably expensive. In general, the power-supply capacity of the power-supply device 7 is determined based on the power consumption of the subscriber-switch board as well as the power supply to the analog telephones, wherein the power-supply capacity relating to the power supply to the analog telephones is determined based on the number of subscribers simultaneously engaging in calls.

When personal computers PC are connected to the subscriber-switch board, modems are used as intermediaries for the connection. In this case, the subscriber-line circuits 2 supply power to modems, and the supplied current is used for detecting a start and an end of a call made by a personal computer PC. Since the personal computers PC receive AC power for their own operation from utility power supply, the current supplied from the subscriber-line circuit 2 is used for no purpose other than that of detecting a start and an end of a call.

A recent progress in use of personal-computer communications and the internet has resulted in a rapid increase in the number of data-communication calls, which are different from conventional voice calls in some aspects. Data-communication calls relating to the internet are referred to as internet calls. The internet call is generally characterized as being a lengthy call, which is held for a long time period to engage in an incessant communication. When the number of internet calls is increased, the amount of power supply is increased by a significant margin. In the case of a subscriber-switch board servicing to twenty-thausand subscribers, for example, the power-supply capacity of the power-supply device 7 is [150 A/–48 V] when most of the calls are expected to be voice calls. If a projection is given that the number of simultaneous calls will double because of an increase in the number of internet calls, the power-supply capacity of the power-supply device 7 needs to be [300 A/–48 V].

As the power-supply capacity of the power-supply device is increased in accordance with an increase in demand for the power supply, a price of the power-supply device will be increased, and so will be a cost of consumed power which is incurred as everyday expenses. As a result, a price of the switching system in its entirety as well as an operating cost thereof will be increased.

Accordingly, there is a need for preventing a power-supply capacity from being increased even when there is an increase in the number of non-conventional calls such as internet calls having different characteristics from those of conventional voice calls.

SUMMARY OF THE INVENTION

Accordingly, it is a general object of the present invention to satisfy the need described above.

It is another and more specific object of the present invention to prevent a power-supply capacity from being increased even when there is an increase in the number of non-conventional calls such as internet calls having different characteristics from those of conventional voice calls.

In order to achieve the above objects according to the present invention, a device for controlling power supply to subscribers in a digital subscriber-switch board includes subscriber-line circuits which supply power to the subscribers, and a carrier-detection unit which is connected to a communication path to detect a carrier signal of a modem once the communication path is established between a caller and a receiver, the caller being one of the subscribers, wherein one of the subscriber-line circuits corresponding to the one of the subscribers is controlled to suspend power supply to the one of the subscribers when the carrier-detection unit detects the carrier signal on the communication path.

In the device described above, the power supply from the subscriber-line circuit to the subscriber is suspended if a call made by the subscriber is a data-communication call. Therefore, a reduction can be made to the amount of power supply to the subscribers.

According to one aspect of the present invention, the device as described above is such that the carrier-detection unit continues to monitor the carrier signal on the communication path after the suspension of the power supply, and the one of the subscriber-line circuits is controlled to resume power supply to the one of the subscribers when the carrier-detection unit detects a termination of the carrier signal, the resumed power supply being used for monitoring an end of a call between the caller and the receiver.

In the device described above, the power supply to the subscriber is resumed after the termination of the carrier signal is detected during a data-communication call. Therefore, the resumed power supply can be used for detecting an end of the call just as in the case of a conventional voice call.

According to another aspect of the present invention, the device described above further includes a signal-termination-detection unit which checks whether a signal power is present in the communication path after the suspension of the power supply, wherein the one of the subscriber-line circuits is controlled to resume power supply to the one of the subscribers when the signal-termination-detection unit finds no signal power, the resumed power supply being used for monitoring an end of a call between the caller and the receiver.

In the device described above, the power supply to the subscriber is resumed if no signal power is detected during a data-communication call. Therefore, the resumed power supply can be used for detecting an end of the call just as in the case of a conventional voice call. Further, the signal-termination-detection unit has a sole function thereof in detecting a signal power, so that only a simple configuration is necessary for implementing the signal-termination-detection unit at a low cost.

According to another aspect of the present invention, the device described above further includes a central-control unit which is informed of a presence of the carrier signal by the carrier-detection unit, and controls the one of the subscriber-line circuits to suspend power supply to the corresponding one of the subscribers.

According to another aspect of the present invention, the device described above further includes a central-control unit which is informed of absence of the carrier signal by the carrier-detection unit, and controls the one of the subscriber-line circuits to resume power supply to the corresponding one of the subscribers.

According to another aspect of:the present invention, the device described above further includes a central-control unit which is informed of absence of the signal power by the signal-termination-detection unit, and controls the one of the subscriber-line circuits to resume power supply to the corresponding one of the subscribers.

According to another aspect of the present invention, the device described above is such that the communication path to which the carrier-detection unit is connected is a communication path on a receiver side.

In the device described above, a push-button signal transmitted from the subscribers is not confused, and does not bring about a false detection of a carrier signal.

According to another aspect of the present invention, the device described above is such that the carrier-detection unit includes a carrier-signal-detection unit which checks whether a signal is present within a range of carrier frequencies, an outside-band-signal-detection unit which checks whether a signal is present outside the range of carrier frequencies, and a check unit which detects a presence of the carrier signal when the carrier-signal-detection unit detects a presence of a signal within the range of carrier frequencies and the outside-band-signal-detection unit finds no signal outside the range of carrier frequencies, wherein the communication path to which the carrier-detection unit is connected is a communication path on a caller side.

In the device described above, even if a push-button signal containing some frequencies inside the range of carrier frequencies is transmitted from the caller side, such a signal can be distinguished from carrier signals, thereby avoiding a false detection of a carrier signal by confusing the push-button signal.

According to another aspect of the present invention, the device described above is such that the one of the subscriber-line circuits nullifies an on-hook-detection function thereof for at least a period during which the power supply is suspended.

In the device described above, even if the subscriber-line circuit generates a false on-hook-detection signal because of noises or the like during the suspension of power supply, such an on-hook-detection signal is ignored.

According to another aspect of the present invention, the device described above is such that the one of the subscriber-line circuits nullifies an on-hook-detection function thereof for a predetermined time period following a revival of the power supply.

In the device described above, even if the subscriber-line circuit generates a false on-hook-detection signal because of noises or the like during the predetermined period following the revival of power supply, such an on-hook-detection signal is ignored.

In order to achieve the objects previously described also according to the present invention, a subscriber-line circuit used in a digital subscriber-switch board and supplying power to a subscriber includes a carrier-detection unit which looks for a carrier signal of a modem on a communication path once the communication path is established through the subscriber-line circuit between a caller and a receiver, the caller being the subscriber, wherein the power supply to the subscriber is suspended when the carrier-detection unit detects the carrier signal on the communication path.

In the subscriber-line circuit described above, the power supply from the subscriber-line circuit to the subscriber is suspended if a call made by the subscriber is a data-communication call. Therefore, a reduction can be made to the amount of power supply to the subscribers.

According to one aspect of the present invention, the subscriber-line circuit as described above is such that the carrier-detection unit monitors the carrier signal on the communication path after the suspension of the power supply, and the power supply is resumed when the carrier-detection unit detects a termination of the carrier signal, the resumed power supply being used for monitoring an end of a call between the caller and the receiver.

In the device described above, the power supply to the subscriber is resumed after the termination of the carrier signal is detected during a data-communication call. Therefore, the resumed power supply can be used for detecting an end of the call just as in the case of a conventional voice call.

According to another aspect of the present invention, the subscriber-line circuit described above is such that the carrier-detection unit comprises a digital signal processor.

Functions of the subscriber-line circuits are implemented by using a digital signal processor in an increasing number of devices. In light of this, use of a digital signal processor for implementing the carrier-detection unit can achieve the configuration of the present invention solely based on an extension of software without expanding a hardware configuration, thereby preventing an undesirable increase in costs.

According to another aspect of the present invention, the subscriber-line circuit described above is such that the carrier-detection unit includes a carrier-signal-detection unit which checks whether a signal is present within a range of carrier frequencies, an outside-band-signal-detection unit which checks whether a signal is present outside the range of carrier frequencies, and a check unit which detects a presence of the carrier signal when the carrier-signal-detection unit detects a presence of a signal within the range of carrier frequencies and the outside-band-signal-detection unit finds no signal outside the range of carrier frequencies.

In the subscriber-line circuit described above, even if a push-button signal containing some frequencies inside the range of carrier frequencies is transmitted from the caller side, such a signal can be distinguished from carrier signals, thereby avoiding a false detection of a carrier signal by confusing the push-button signal.

According to another aspect of the present invention, the subscriber-line circuit described above is such that an on-hook-detection function thereof is nullified for at least a period during which the power supply is suspended.

In the subscriber-line circuit described above, even if the subscriber-line circuit generates a false on-hook-detection signal because of noises or the like during the suspension of power supply, such an on-hook-detection signal is ignored.

According to another aspect of the present invention, the subscriber-line circuit described above is such that an on-hook-detection function thereof is nullified for a predetermined time period following a revival of the power supply.

In the subscriber-line circuit described above, even if the subscriber-line circuit generates a false on-hook-detection signal because of noises or the like during the predetermined period following the revival of power supply, such an on-hook-detection signal is ignored.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
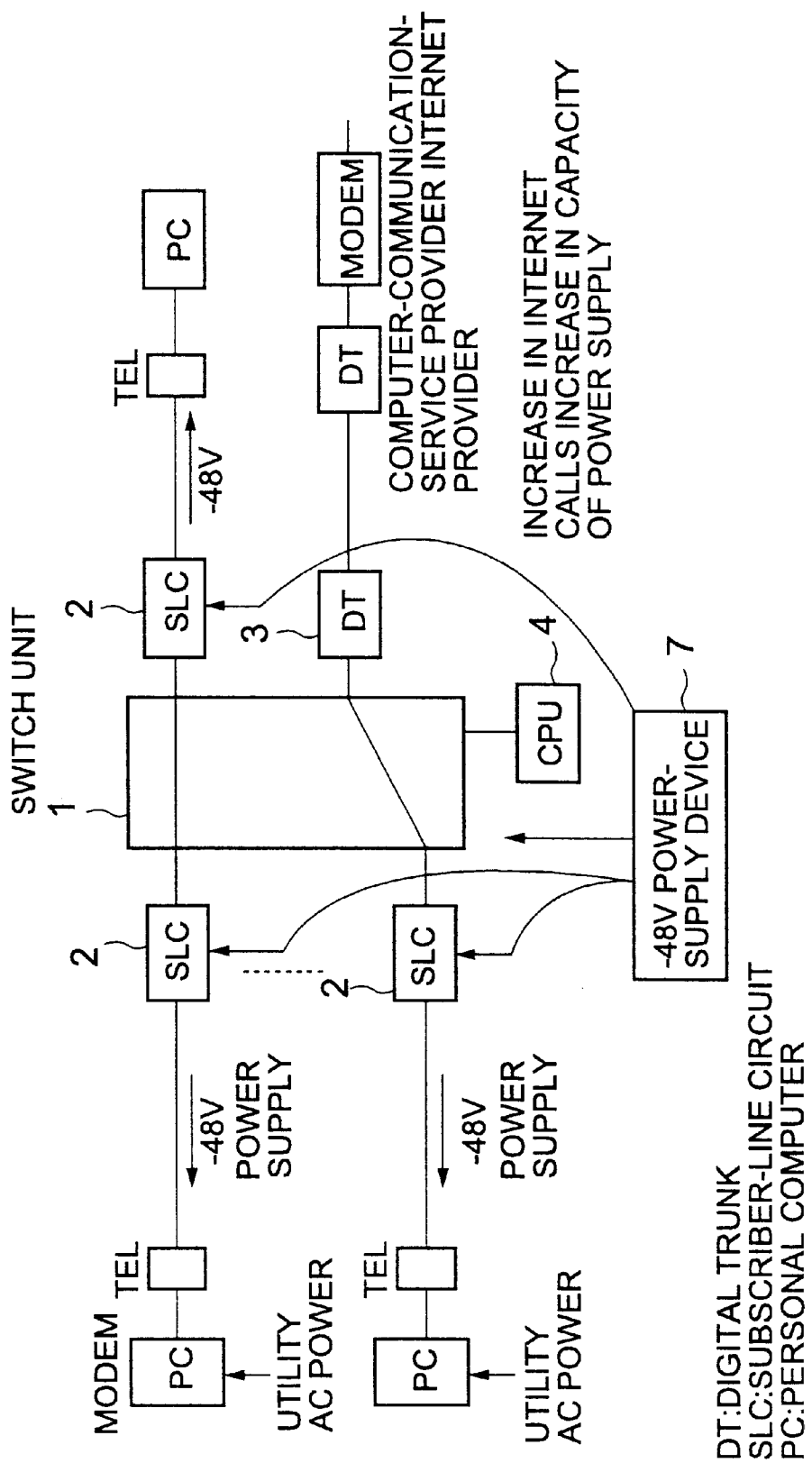
FIG. 1 is a block diagram showing a system configuration in which personal computers are accommodated via a digital-subscriber-switch board where the digital-subscriber-switch board generally deals with voice calls.
Figure 2:
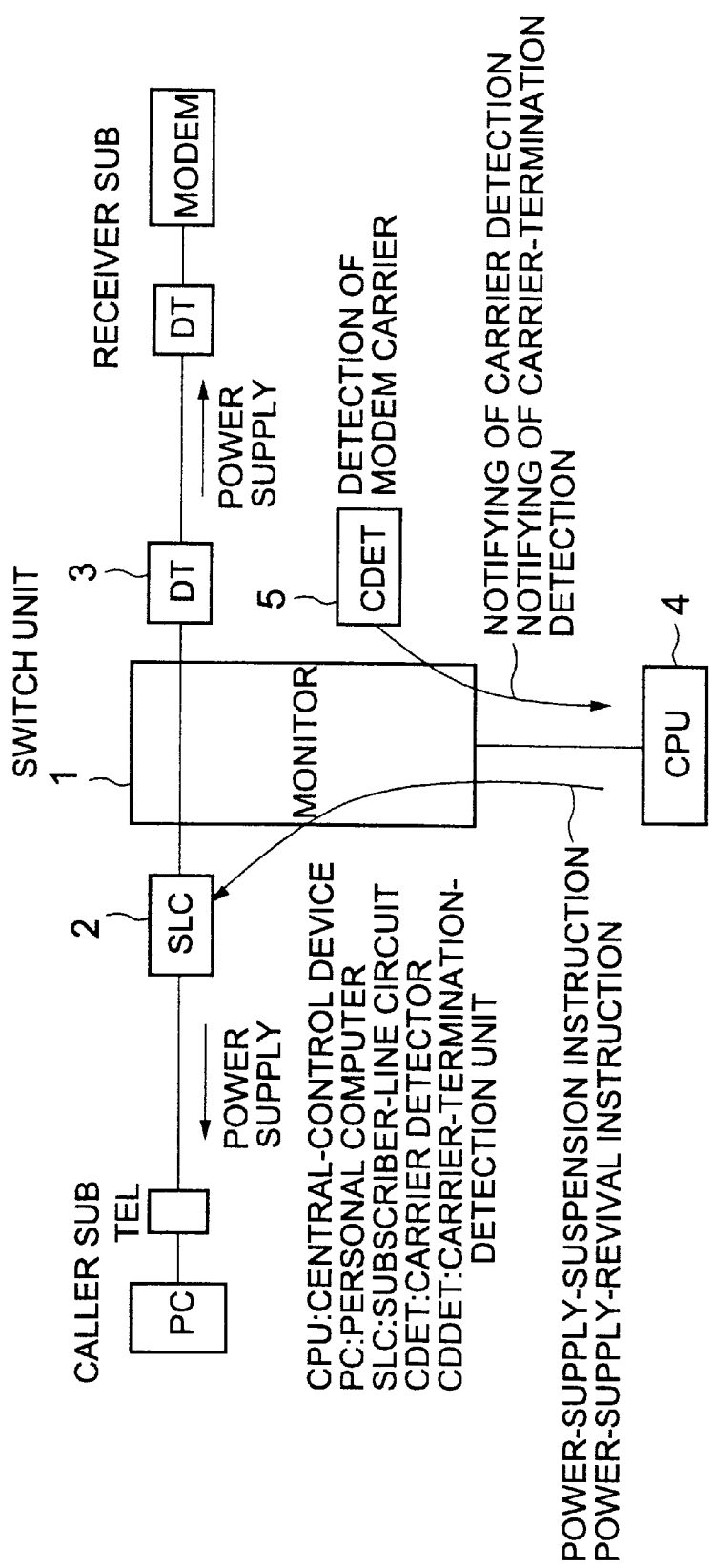
FIG. 2 is a schematic diagram showing a subscriber-switch board provided with a subscriber-power-supply-control device according to a first embodiment of the present invention.

FIG. 2 is a schematic diagram showing a subscriber-switch board provided with a subscriber-power-supply-control device according to a first embodiment of the present invention. The subscriber-switch board is a digital switch board, and includes the switch unit 1, the subscriber-line circuit 2, the digital trunk 3, the central-control device 4, and a modem-carrier detector 5. The switch unit 1 includes digital switch circuits which switches signals by handling these signals in form of digital signals. The subscriber-switch board accommodates the personal computer PC via the subscriber-line circuit 2, and further accommodates a modem belonging to a personal-computer-communication-service provider via the digital trunk 3.

The subscriber-switch board of this embodiment differs from the subscriber-switch board of the related art in that the modem-carrier detector 5 (hereinafter referred to as a carrier detector 5) is additionally provided, and in that the subscriber-line circuit 2 has a different configuration reflecting the presence of the carrier detector 5. The subscriber-line circuit 2 suspends supply of power when the central-control device 4 sends an instruction to suspend the power supply. The carrier detector 5 detects a modem-carrier signal (hereinafter referred to as carrier signal) included in communication signals sent from a receiver side to the switch unit 1.

Figure 3:
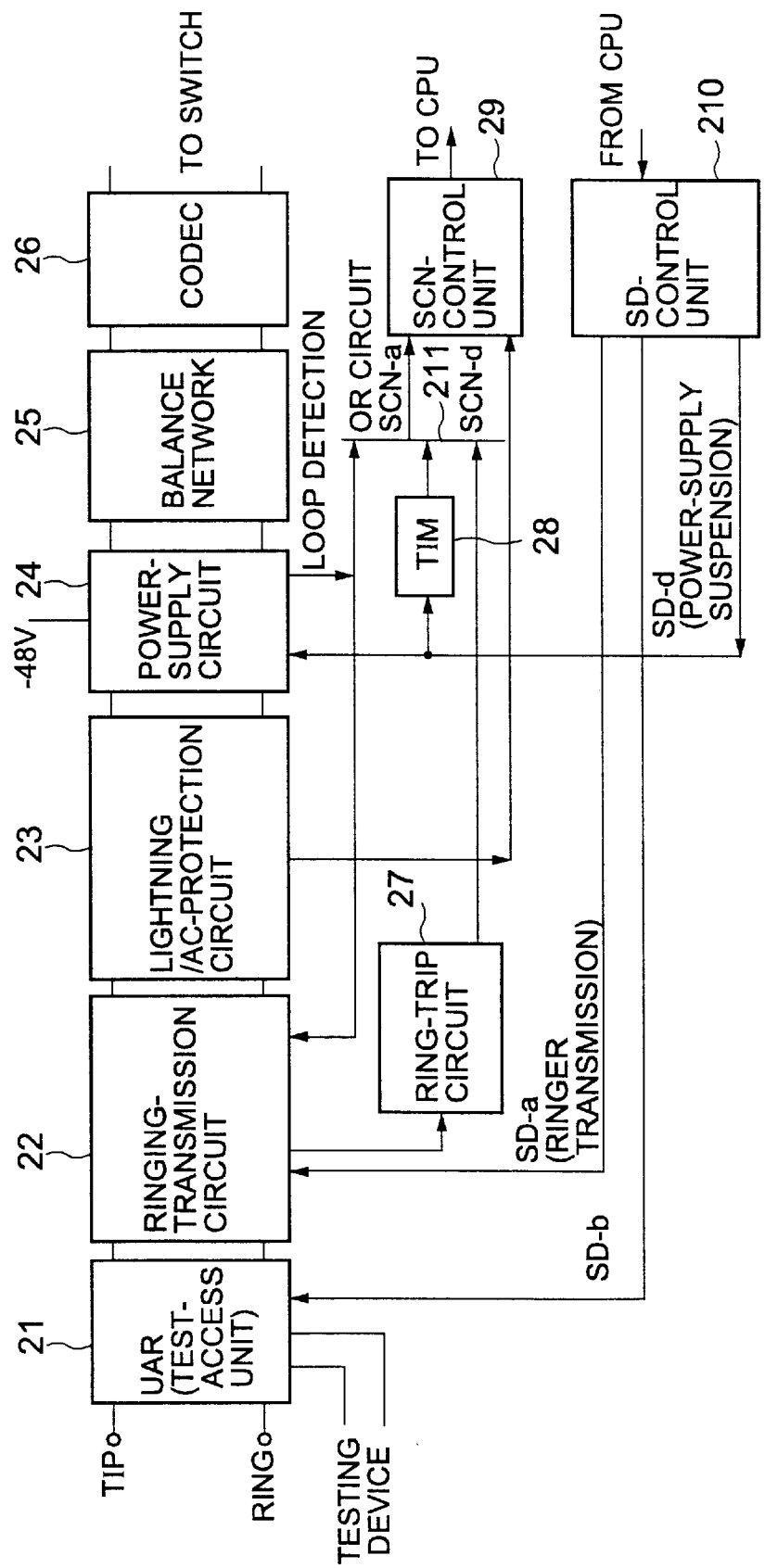
FIG. 3 is a block diagram of a subscriber-line circuit.

FIG. 3 is a block diagram of the subscriber-line circuit 2. The subscriber-line circuit 2 includes a test-access unit 21, a ringing-transmission circuit 22, a lightning/AC-protection circuit 23, a power-supply circuit 24, a balance network 25, a codec 26, a ring-trip circuit 27, a timing circuit 28, an SCN-control unit 29, and an SD-control unit 210. Here, the test-access unit 21, the ringing-transmission circuit 22, the lightning/AC-protection circuit 23, the balance network 25, the codec 26, the ring-trip circuit 27, and the SCN-control unit 29 have such conventional configurations as used in the related art.

The SD-control unit 210 receives an instruction from the central-control device 4, and supplies a ringing-transmission signal SD-a to the ringing-transmission circuit 22 and a signal SD-b to the test-access unit 21 in response to the received instruction. In the present invention, the SD-control unit 210 further generates a power-supply-suspension signal SD-d in response to a power-supply-suspension instruction from the central-control device 4, and supplies the power-supply-suspension signal SD-d to the power-supply circuit 24 and the timing circuit 28. Upon receiving a power-supply-revival instruction from the central-control device 4, the SD-control unit 210 turns off the power-supply-suspension signal SD-d.

The SCN-control unit 29 engages in operations regarding controls, and provides a state indication with respect to the power-supply circuit 24 indicating whether a particular subscriber is in an on-hook state or in an off-hook state. When receiving an on-hook-detection signal SCN-a from the OR circuit 211 as a result of an OR operation between a loop-detection signal LOOP from the power-supply circuit 24 and a ring-trip signal SCN-d from the ring-trip circuit 27, the SCN-control unit 29 supplies an on-hook-state indication to the central-control device 4.

In the present invention, the power-supply-suspension signal SD-d supplied from the SD-control unit 210 is input to the OR circuit 211 via the timing circuit 28. This configuration allows the power-supply-suspension signal SD-d to invalidate the on-hook-detection signal SCN-a (i.e., to provide an off-hook indication). That is, during an active period of the power-supply-suspension signal SD-d, neither the loop-detection signal LOOP nor the ring-trip signal SCN-d prompts the on-hook-detection signal SCN-a to be activated. Rather, the on-hook-detection signal SCN-a stays deactivated, thereby indicating an off-hook state to the central-control device 4.

The timing circuit 28 keeps the on-hook-detection signal SCN-a in an invalidated condition for a predetermined time period (e.g., 100 ms) after the power-supply-suspension signal SD-d is turned off, thereby providing a certain timing control. Upon a passage of 100 ms after the turning off of the power-supply-suspension signal SD-d, the on-hook-detection signal SCN-a is freed from the invalidated condition thereof, and indicates an on-hook state as the loop-detection signal LOOP is input. This timing control is put in place in order to wait for a loop-detection circuit provided in the power-supply circuit 24 to start an operation thereof, which will be described later in detail.

The power-supply circuit 24 suspends power supply in response to the power-supply-suspension signal SD-d supplied from the SD-control unit 210. Namely, upon receiving a power-supply-suspension instruction from the central-control device 4, the SD-control unit 210 in the subscriber-line circuit 2 supplies the power-supply-suspension signal SD-d to the power-supply circuit 24, so that the operation of the power-supply circuit 24 is turned off, thereby stopping supply of a direct current of −48 V to the subscriber side.

Figure 4:
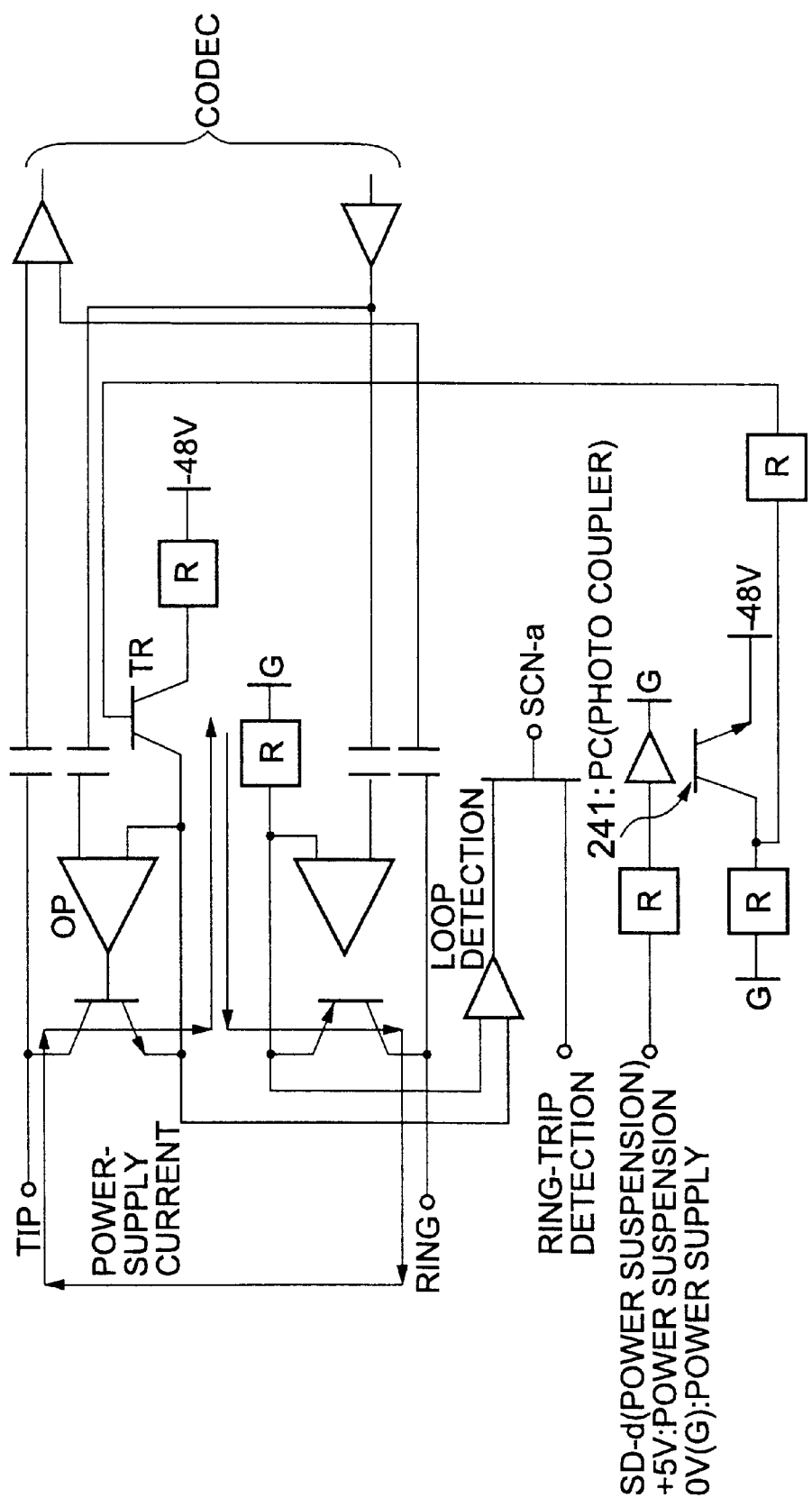
FIG. 4 is a circuit diagram showing a configuration of a power-supply circuit.

FIG. 4 is a circuit diagram showing a configuration of the power-supply circuit 24.

The power-supply circuit 24 includes a photo-coupler 241 which receives the power-supply-suspension signal SD-d. An output of the photo-coupler 241 is supplied to a base node of a transistor TR, which is inserted in series into a circuit for supplying a direct current from the power supply of −48 V. When receiving the power-supply-suspension signal SD-d from the SD-control unit 210, the photo-coupler 241 is turned on, so that the transistor TR is turned off to suspend the supply of power of −48 V to the subscriber side. Further, a loop-detection circuit is provided in order to output the loop-detection signal LOOP when a direct-current loop is detected (i.e., when an on-hook operation by a subscriber is detected).

The carrier detector 5 is connected to a monitor path, which is connected to a receiver-side path of the switch unit 1 as an additional connection, and a plurality of the carrier detectors 5 are provided in the switch board in order to cope with a plurality of internet calls. The carrier detector 5 detects whether such carrier-frequency component as defined by the ITU-T standard is present in the monitor path, and notifies the central-control device 4 of a detected carrier status by means of a scan signal.

In detail, the carrier detector 5 includes a filter-unit and a power-detection/check unit for detecting a carrier which complies with a standard such as ITU-T, V21, V22, V32, V34, V.FC, etc., and checks whether a carrier-signal component is present in a monitor path, which is established as a duplicate connection. In the case of V34 (28.8 kbps), for example, a carrier frequency on the lower frequency side is 1600 Hz, and a carrier frequency on the upper frequency side is 1800 Hz. In this case, therefore, a detection of a signal higher than a predetermined power level (e.g., more than −25 dBm) within a frequency band between 1600 Hz and 1800 Hz over a predetermined time period gives a check result indicative of presence of a carrier signal.

Figure 5:
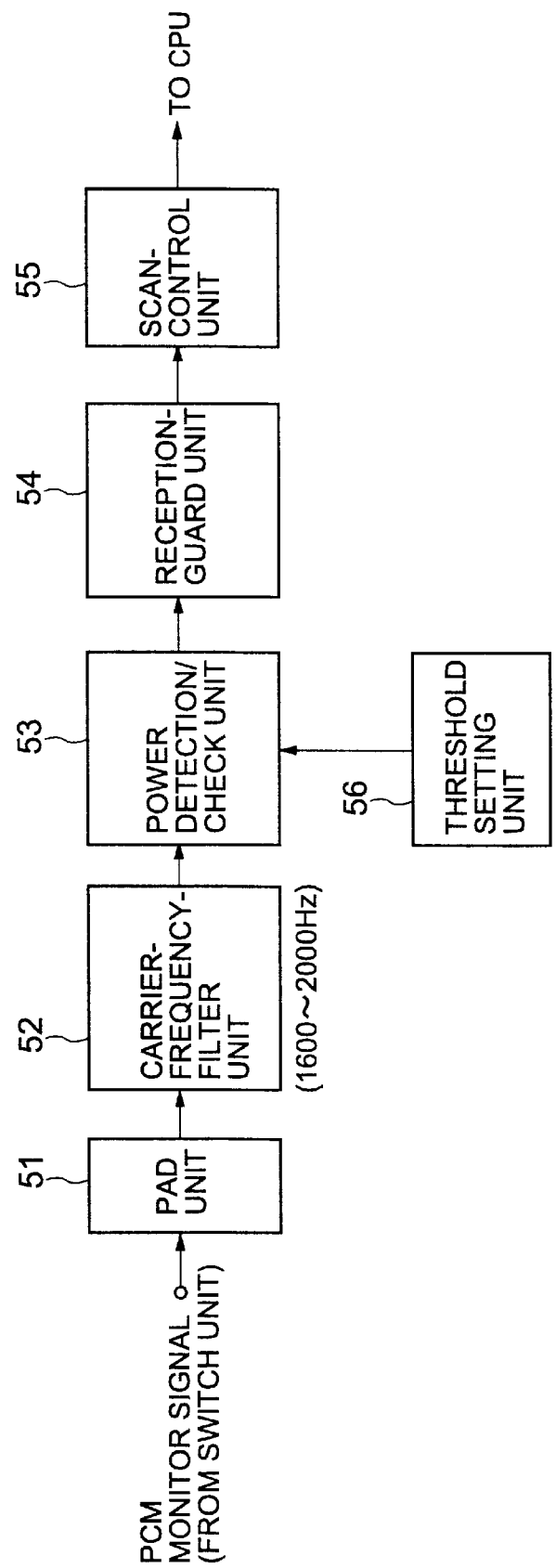
FIG. 5 is a block diagram of a carrier detector.

FIG. 5 is a block diagram of the carrier detector 5. In FIG. 5, a PAD unit 51 makes a level adjustment with respect to an input monitor signal. A carrier-frequency-filter unit 52 allows frequency components to pass therethrough only if these frequency components fall within a range of carrier frequencies (e.g., 1600 Hz through 1800 Hz). A power-detection/check unit 53 obtains a power of an output signal of the carrier-frequency-filter unit 52 through a power calculation, and makes a comparison between the obtained power and a predetermined threshold (e.g., −25 dBm) supplied from a threshold setting unit 56. If the obtained power is greater than the predetermined threshold, it is ascertained that a carrier signal is present, and a power-detection signal is generated. A reception-guard unit 54 checks whether a detected carrier status indicating presence of a carrier signal is held for a predetermined time period (e.g., 40 ms), and informs a scan-control unit 55 of the presence of the carrier signal only when there is a continuous indication of presence of the carrier signal during the entirety of this time period. This is intended to provide a safe guard against a faulty detection of a carrier signal. The scan-control unit 55 accumulates a presence/absence status of a carrier signal with regard to each path successively monitored in the switch unit 1, and informs the central-control device 4 of the accumulated statuses by means of a scan signal. The central-control device 4 reads the accumulated statuses regarding presence/absence of a carrier signal from the scan-control unit 55 a predetermined time period (e.g., 100 ms) after the setting of the monitor paths.

Operations of this embodiment will be described with reference to the accompanying drawings. FIGS. 6 through 16 are illustrative drawings for explaining the operations of the first embodiment.

Figure 6:
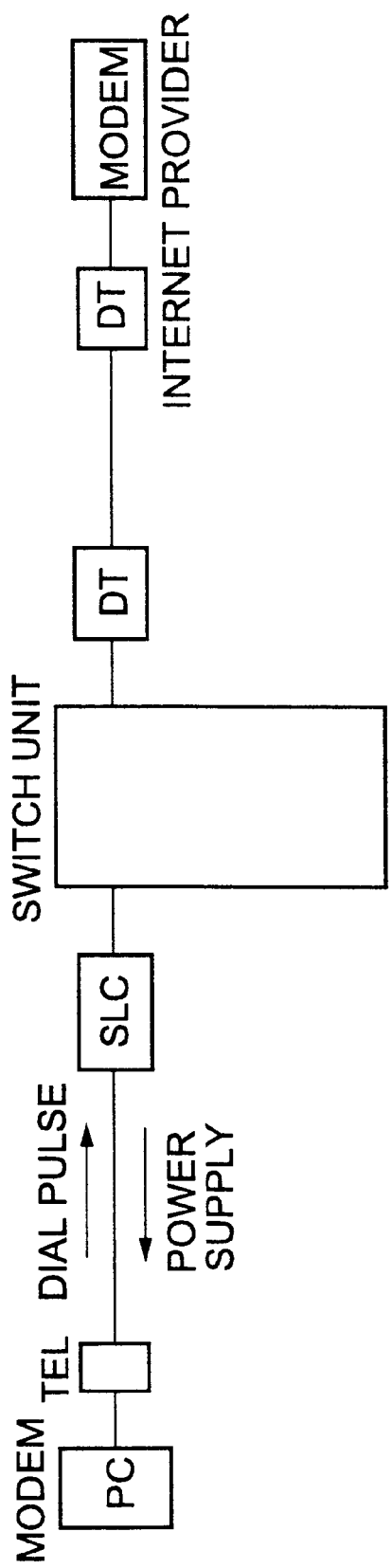
FIG. 6 is an illustrative drawing for explaining operations of the first embodiment.

As shown in FIG. 6, a personal computer PC generates a call by transmitting dial pulses to the switch board with an aim of requesting an internet provider to establish an internet connection. In response, the central-control device 4 of the switch board supplies a direct current to the personal computer PC.

Figure 7:
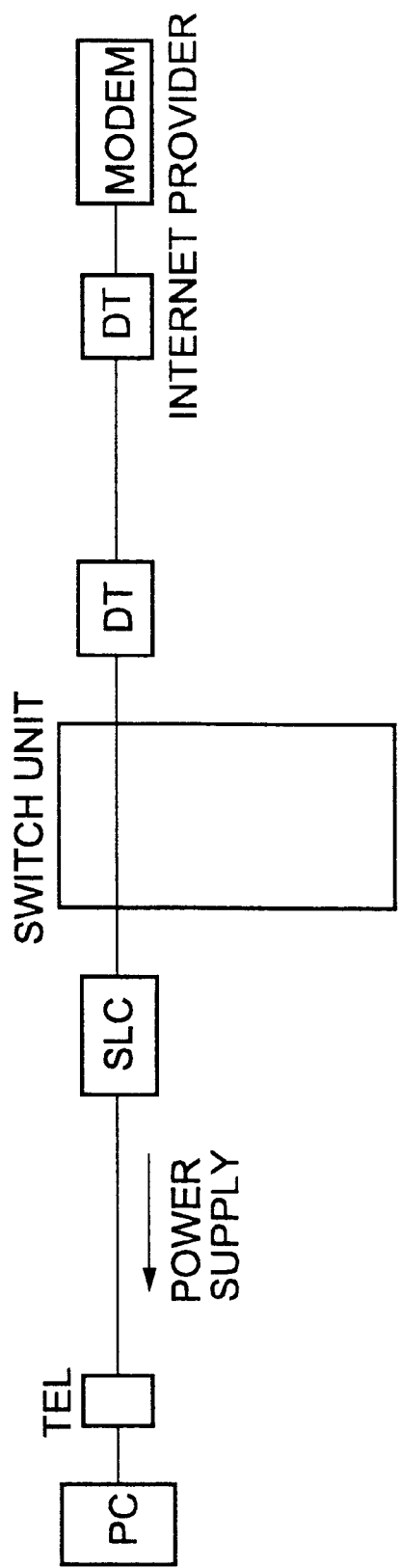
FIG. 7 is an illustrative drawing for explaining the operations of the first embodiment.

As shown in FIG. 7, the switch board uses the switch unit 1 to connect the personal computer PC to the internet provider, thereby establishing an internet connection.

Figure 8:
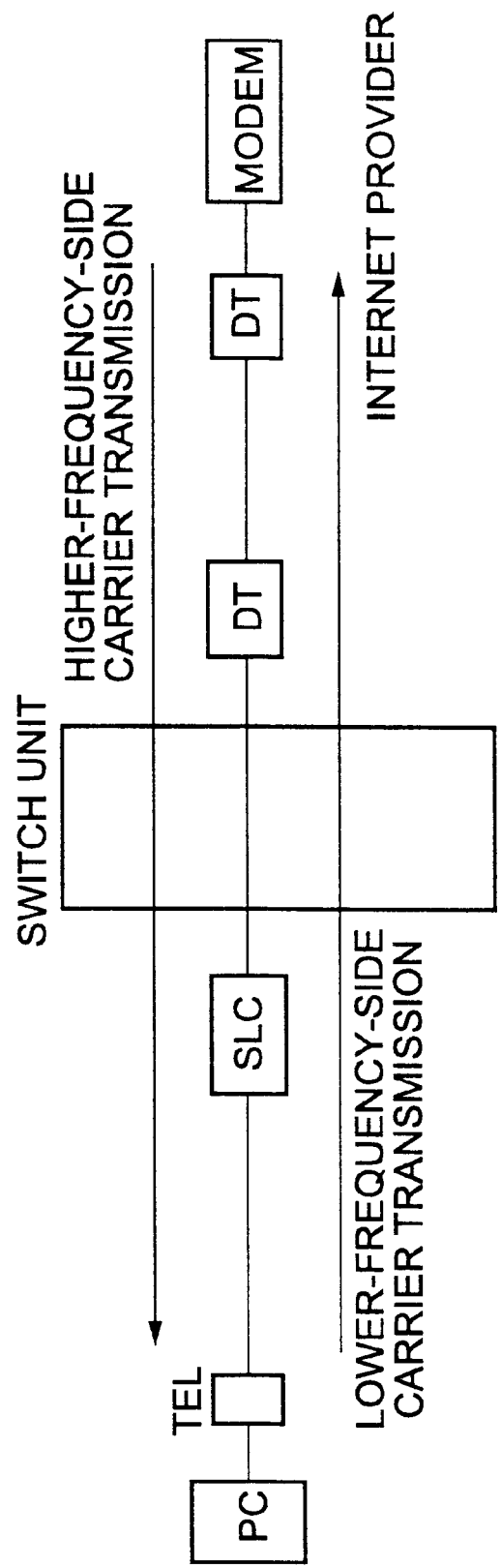
FIG. 8 is an illustrative drawing for explaining the operations of the first embodiment.

As shown in FIG. 8, data is transmitted from the personal computer PC to the internet provider by using a lower-frequency-side carrier signal. On the other hand, a higher-frequency-side carrier signal is used when data is transmitted from the internet provider to the personal computer PC.

Figure 9:
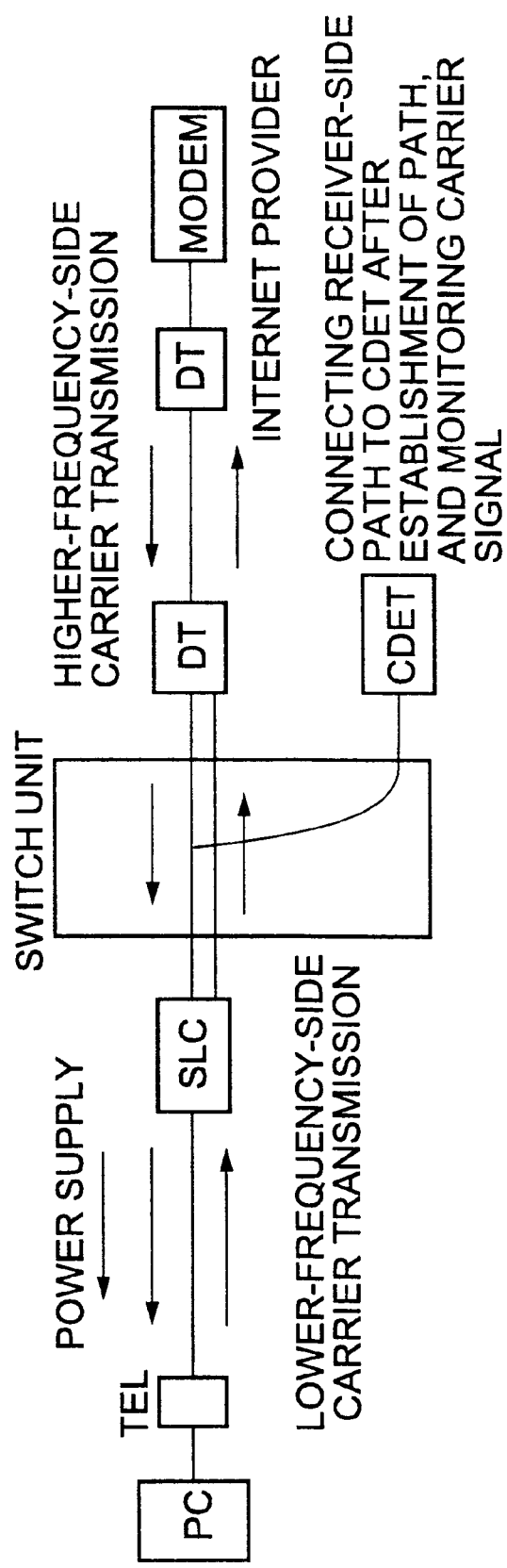
FIG. 9 is an illustrative drawing for explaining the operations of the first embodiment.

After an establishment of communication paths, a check is made as to whether the ongoing communication is a data communication based on an internet call or a conventional communication based on a voice call. As shown in FIG. 9, this check is made by connecting a receiver-side path (path on the side of the internet provider) to the carrier detector 5 for a predetermined time period (e.g., 150 ms) by using the multiple-connection function of the switch unit 1, so that the carrier detector 5 can monitor communication-path signals over the predetermined time period to decide whether a carrier signal is present. In data communication, a full-two-way-communication scheme is normally employed with a sender-side path (caller-side path) and a receiver-side path being established, and both the sender-side path and the receiver-side path continuously convey a modem carrier signal without exception. If a carrier signal is detected on the receiver-side path, therefore, the ongoing communication is ascertained to be a data communication. The carrier detector 5 accumulates results of the checks as scan signals, so that the central-control device 4 can read these results by a scan operation.

Even when the carrier detector 5 is connected to a communication path as an additional connection for the monitoring purpose after the communication path is established in the switch unit 1, such an additional connection does not affect the data communication since all the communication signals (including carrier signals) are conveyed in digital form inside the switch board.

The monitoring of carrier signals is implemented by connecting the carrier detector 5 to a communication path as an additional connection at the same time as when a response is made by the receiver side. Alternately, the carrier detector 5 may be connected to the communication path as an additional connection a predetermined time period (e.g., 3 seconds) after an establishment of transmission/reception paths following a response by the receiver side. In an internet connection and a computer communication of a normal type, a call process is easily handled when the carrier detector 5 is connected to the receiver-side path immediately after the response from the receiver-side, and such a scheme is generally preferred. In the case of a data-communication system in which a carrier signal is not transmitted from a modem immediately after the receiver-side response, however, the carrier detector 5 is connected after a passage of a predetermined time period following the establishment of paths so as to wait until a carrier signal is transmitted. This requires a complex procedure for processing a call, but can shorten a time period during which the carrier detector 5 is held for each monitoring operation. Because of this, a relatively small number of carrier detectors 5 would suffice as reserves when the same number of calls are expected.

When a reduction in the number of the carrier detectors 5 is an important factor, connection of a monitoring path to a data-communication path may be made only with respect to particular recipients (internet providers/personal-computer-communication-service providers). Since the monitoring is not conducted with respect to all the recipients in this case, the number of the carrier detectors 5 can be reduced.

In the present embodiment, the carrier detector 5 is connected to a communication path on the receiver side (internet-provider side). Alternately, the carrier detector 5 may be connected to a communication path on a sender side (caller side), or may be connected to a respective communication path on each side. As part of general use of a communication path, a sender side may transmit a push-button signal during a communication, and such a signal may be confused as a carrier signal. Because of this, it is preferable to connect the carrier detector 5 to the receiver side in general. If a certain appropriate measure is taken, however, the monitoring may be conducted only with respect to the communication path of the sender side. For example, the carrier detector 5 may monitor frequency components not only within the range of carrier frequencies but also outside of the range, and avoids a faulty detection of a carrier signal if substantial frequency components are also observed outside the range. Such a function can be added by an additional circuit, which will be described later in detail. Further, the monitoring may be conducted with respect to both the sender side (caller side) and the receiver side, which can render a reliable identification of data communication.

The switch board is provided with a plurality of carrier detectors 5 so as to cope with a plurality of internet calls. If all of the carrier detectors 5 are currently in use, a connection is not established until one of the carrier detectors 5 becomes available.

Figure 10:
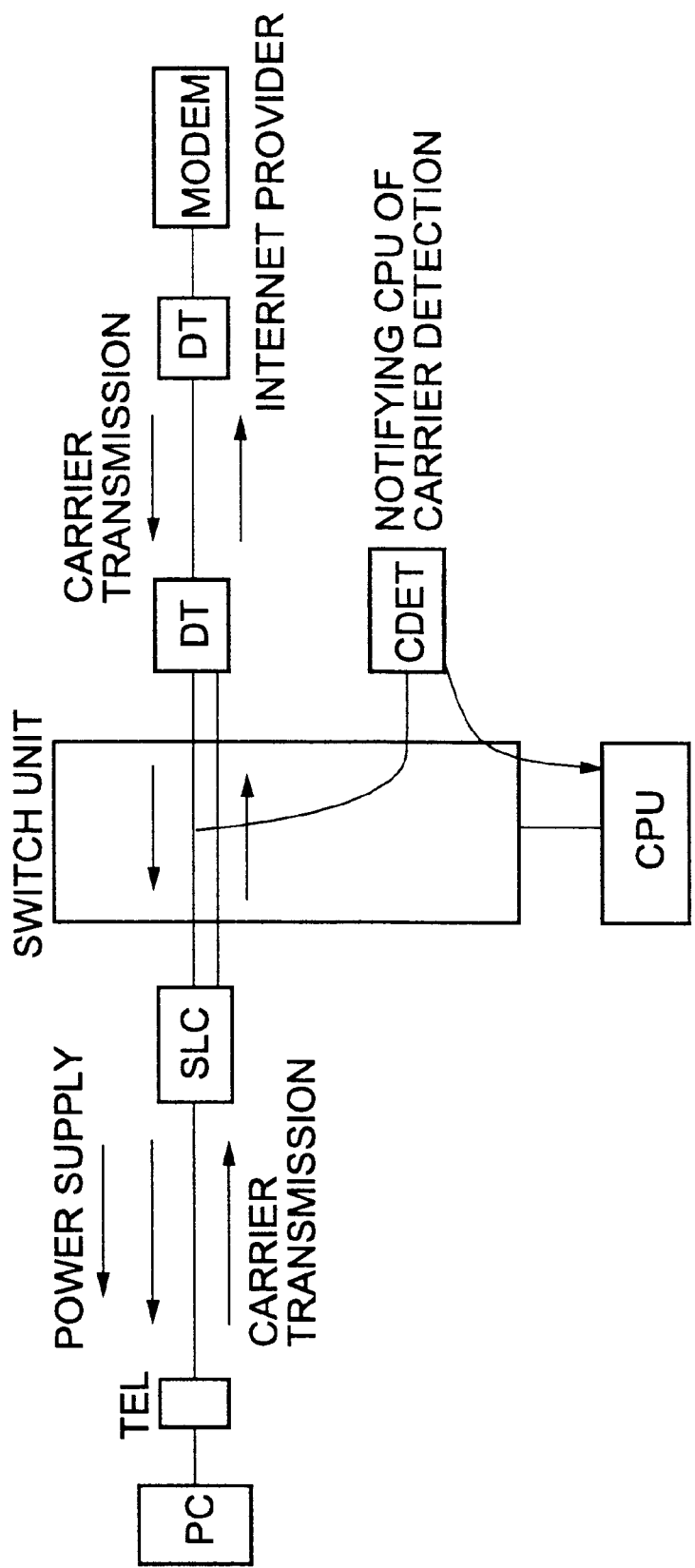
FIG. 10 is an illustrative drawing for explaining the operations of the first embodiment.

A result of carrier-signal detection is sent from the carrier detector 5 to the central-control device 4, as shown in FIG. 10. Namely, the central-control device 4 reads a scan signal indicative of a carrier-signal status from the carrier detector 5 a predetermined time period (e.g., 100 ms) after the establishment of the monitor path.

Figure 11:
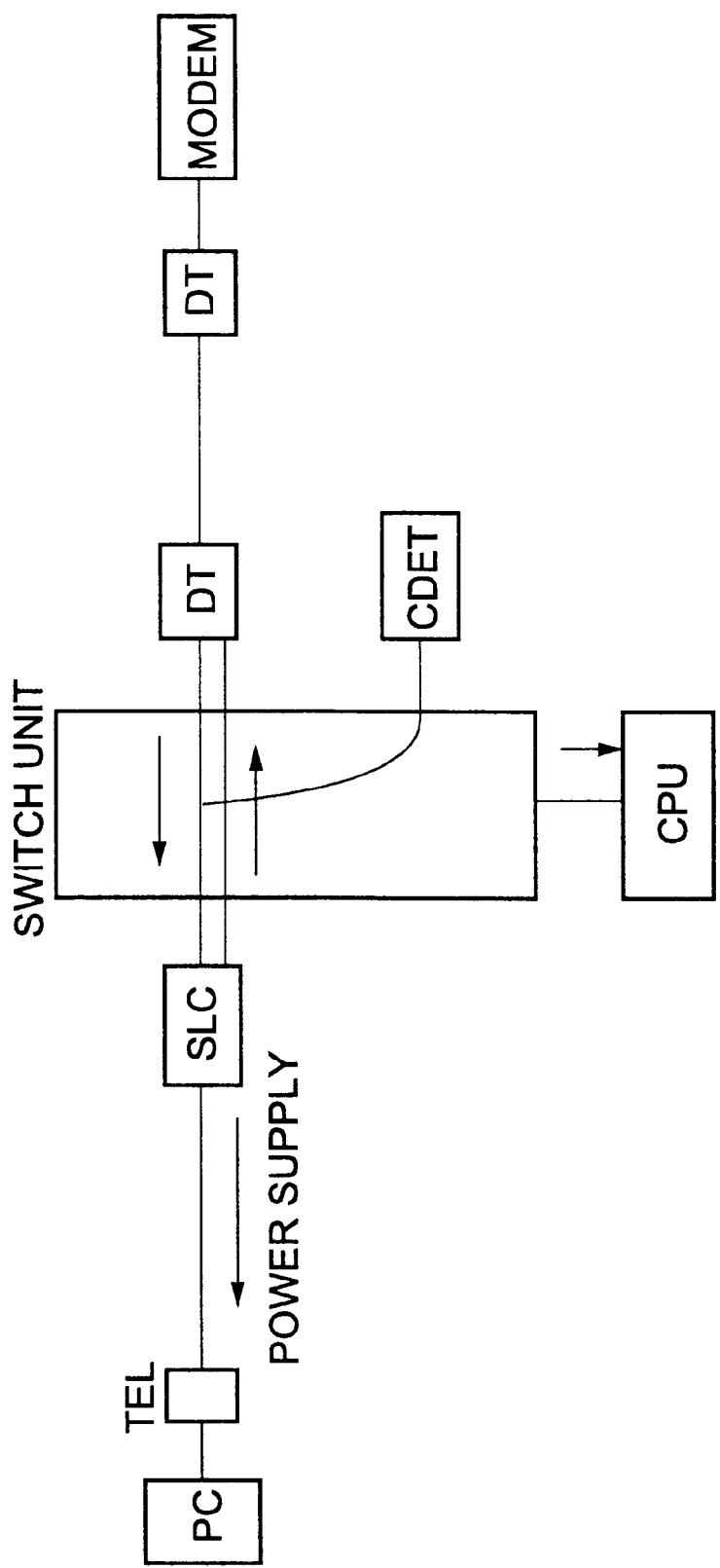
FIG. 11 is an illustrative drawing for explaining the operations of the first embodiment.

If there is no indication that the carrier detector 5 detected a carrier signal, the ongoing communication is a voice communication based on a voice call rather than a data-communication call. In this case, the additional path connected to the receiver-side path is disconnected so as to stop monitoring a carrier signal. The same process as that for a normal voice call will be performed thereafter. Namely, as shown in FIG. 11, a direct current is supplied from the subscriber-line circuit 2 to the sender-side terminal. A released carrier detector 5 will be used for monitoring another path.

Figure 12:
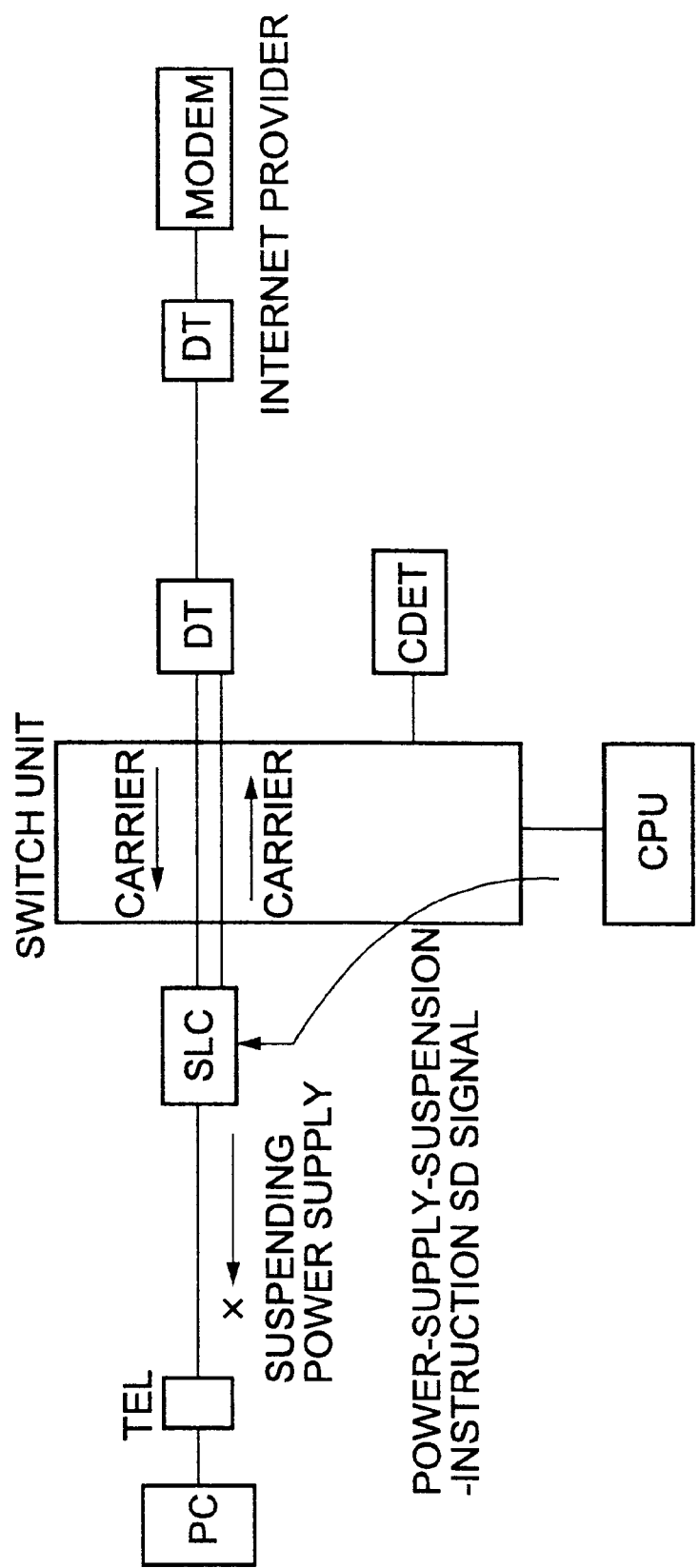
FIG. 12 is an illustrative drawing for explaining the operations of the first embodiment.

If the carrier detector 5 detects a carrier signal, the ongoing communication is ascertained as a data communication. In this case, as shown in FIG. 12, a data-communication mode is employed so as to suspend supply of power. In the data-communication mode, the central-control device 4 sends a power-supply-suspension instruction to the subscriber-line circuit 2 which is situated on the sender side engaging in the communication. In the present embodiment, the receiver side uses a digital trunk. If the receiver side uses an analog subscriber-line circuit in place of the digital trunk, however, the power-supply-suspension instruction is also sent to the subscriber-line circuit provided on the receiver side.

Upon receiving the power-supply-suspension instruction, the subscriber-line circuit 2 on the sender side activates a power-supply-suspension function provided in the power-supply circuit 24, thereby suspending supply of a direct current (e.g., −48 V) to the personal computer PC. At the same time, the additional connection to the receiver-side communication path for connecting the carrier detector 5 is released, (i.e., the carrier monitoring path is disconnected).

Figure 13:
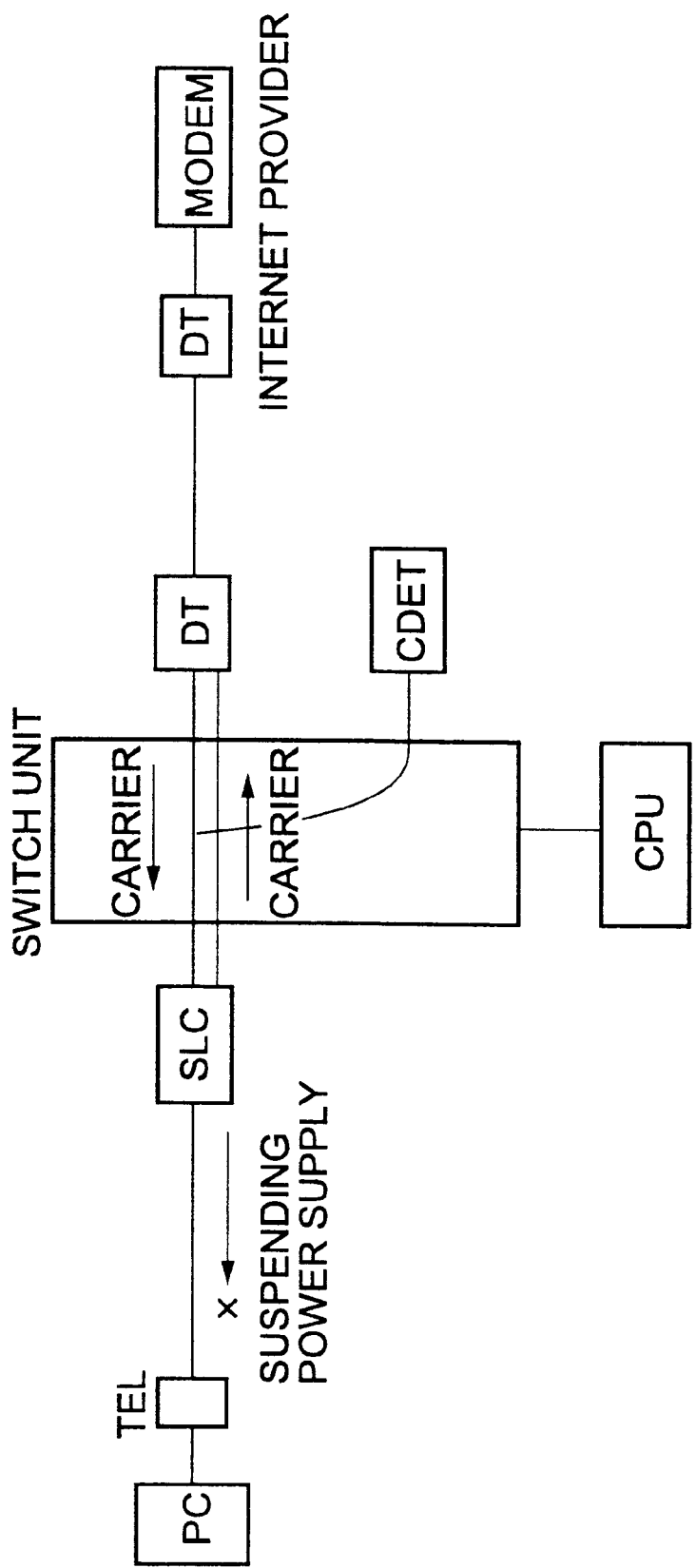
FIG. 13 is an illustrative drawing for explaining the operations of the first embodiment.

After the supply of power to the personal computer PC is suspended, further monitoring of the carrier signal is started for the purpose of detecting an end of the communication. As shown in FIG. 13, the central-control device 4 connects the carrier detector 5 to the sender-side communication path for a predetermined monitoring time period (e.g., 50 ms) at constant intervals (e.g., 600 ms), so that a check is made as to whether a carrier signal is present in the sender-side communication path with respect to the personal computer PC to which the power supply is suspended. If a carrier signal is detected, the monitoring path is disconnected from the sender-side communication path. The monitoring path is reconnected after a predetermined time period (i.e., at the constant intervals) so as to attend to a periodic check of the carrier signal. If the carrier signal is not detected for the predetermined monitoring time period, an end of the communication is detected.

The constant interval and the monitoring time period may be determined by taking into consideration such a cost factor as how small the number of the carrier detectors 5 can be.

In this manner, the present embodiment carries out the monitoring of an end of communication by using the sender-side (caller-side) communication path with respect to the subscriber (personal computer PC) to which power supply is suspended. Use of the sender-side communication path can shorten the time period required before the end of communication is detected, compared to when the receiver-side communication path is used. It should be noted, however, that the monitoring of an end of communication can be conducted by using the receiver-side communication path as well.

When the carrier detector 5 identifies a data communication by monitoring the receiver-side path, a carrier signal needs to be detected continuously for a relatively long time period (e.g., 40 ms), thereby providing a safe guard against a faulty detection. When the same carrier detector 5 is used for detecting an end of communication, however, a time period during which the absence of a carrier signal should be continuously confirmed is taken to be a shorter time period such as 20 ms. In consideration of the relatively large number of monitoring operations to be repeated, use of such a shorter time period is quite beneficial so as to reduce a time period during which the carrier detector 5 is occupied. In this case, the length of the monitoring time period may be set in the carrier detector 5, and, also, a scan interval of the central-control device 4 may be set accordingly.

Figure 14:
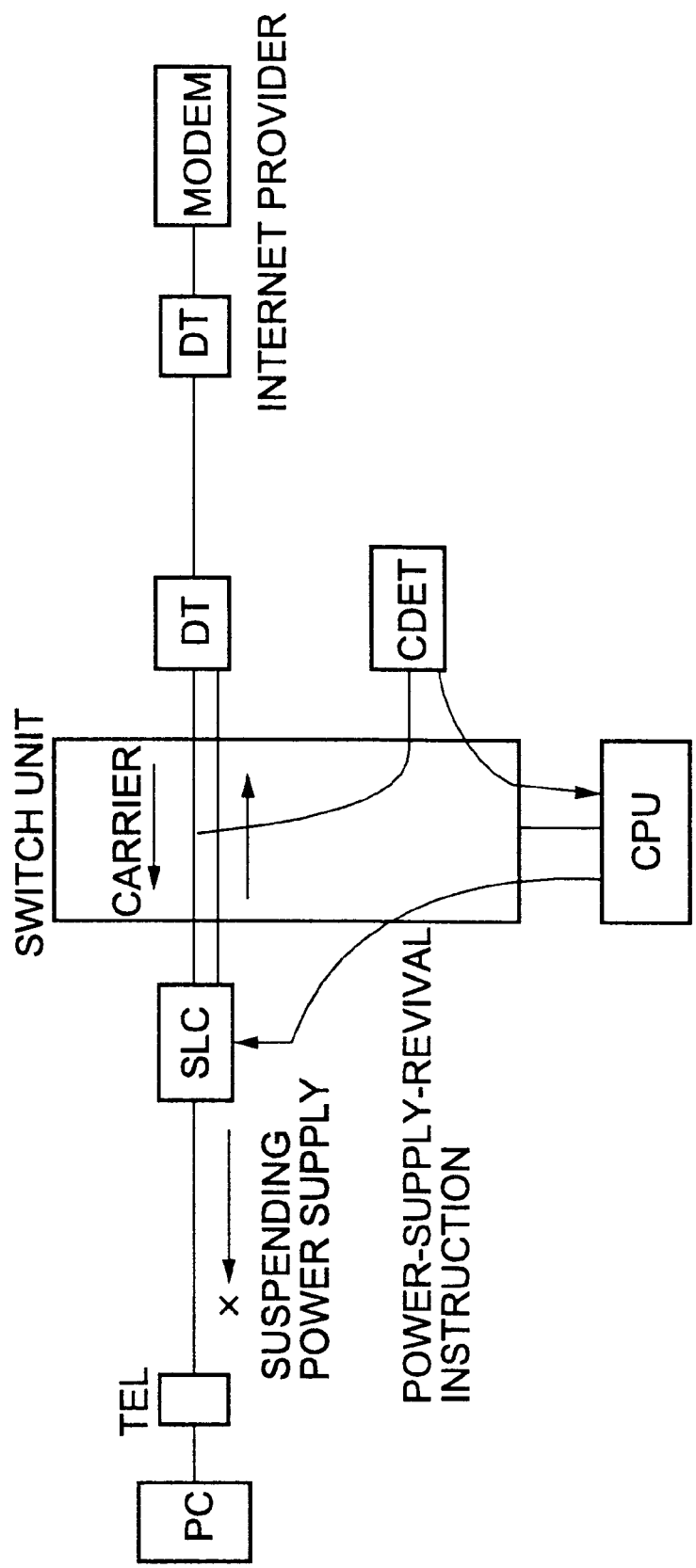
FIG. 14 is an illustrative drawing for explaining the operations of the first embodiment.

When the carrier detector 5 detector an end of communication by finding no carrier signal in the monitoring path, as shown in FIG. 14, the central-control device 4 sends a power-supply-revival instruction (power-supply-suspension-nullification instruction) to the subscriber-line circuit 2 which has been suspending the power supply.

Figure 15:
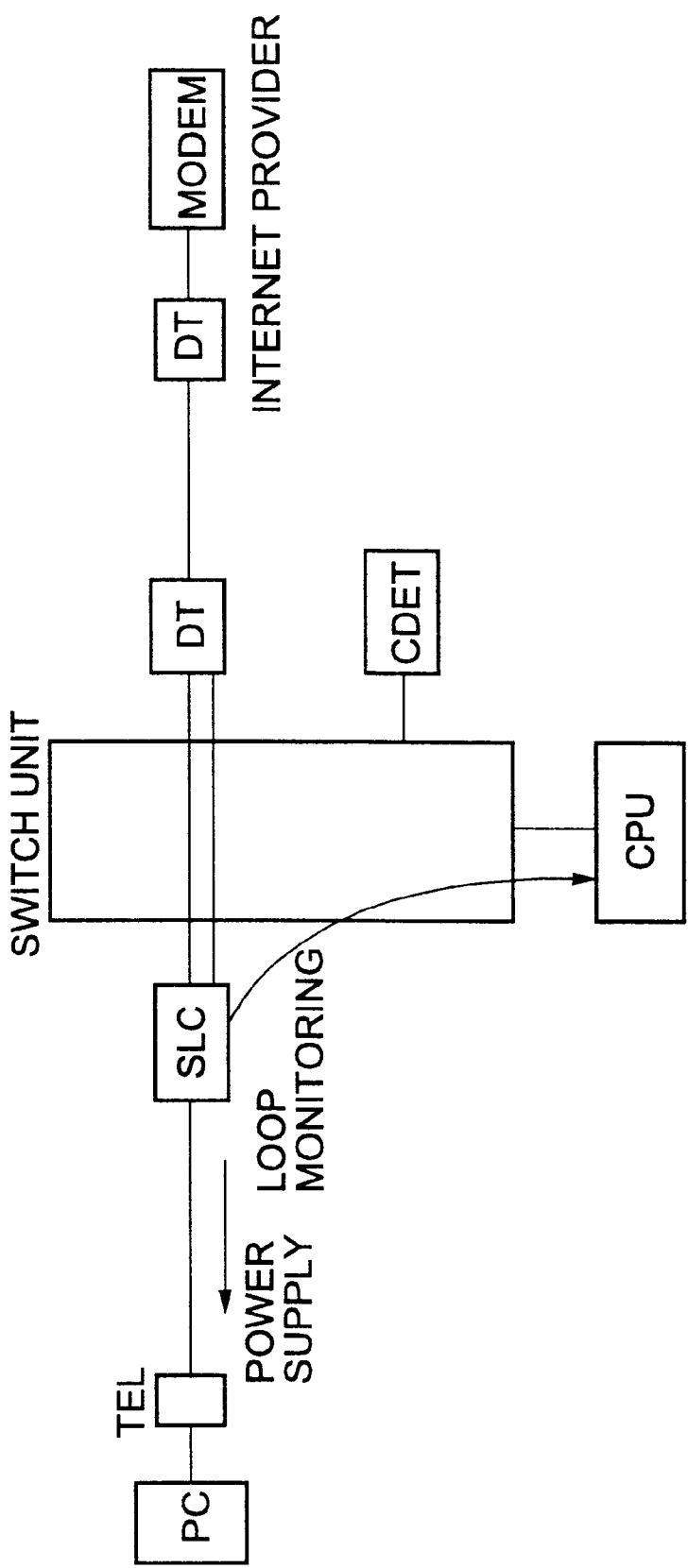
FIG. 15 is an illustrative drawing for explaining the operations of the first embodiment.
Figure 16:
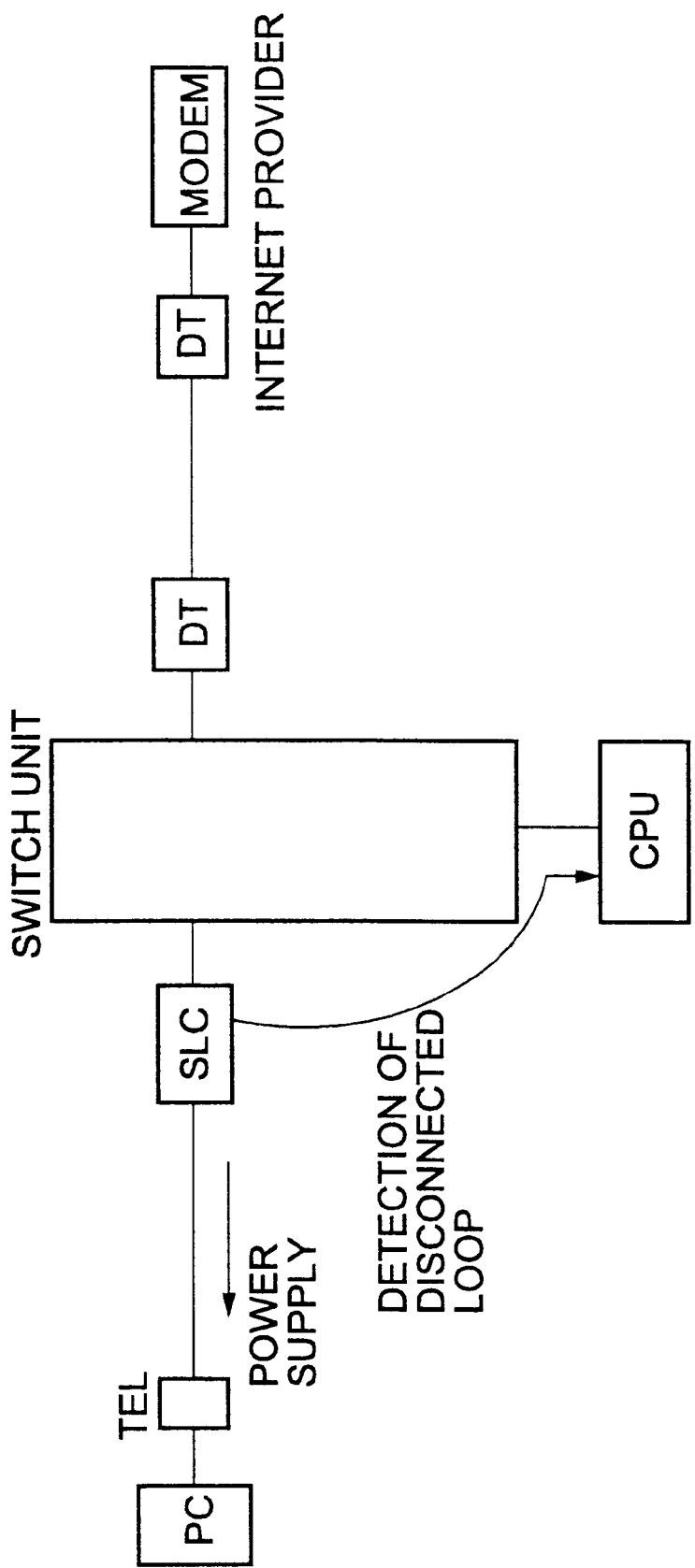
FIG. 16 is an illustrative drawing for explaining the operations of the first embodiment.

In response, as shown in FIG. 15, the subscriber-line circuit 2 resumes supply of power by means of the power-supply circuit 24 so as, to supply a direct current of –48 V to the subscriber (personal computer PC), and starts monitoring an on-hook action of the subscriber by checking whether a loop of this direct current is disconnected. During a time period from the restart of power supply to a detection of an on-hook action by the subscriber, the central-control device 4 does not engage in a process of handling an end of communication, but rather performs a conventional process to handle a call. When the subscriber-line circuit 2 detects an on-hook state, this is reported to the central-control device 4 as shown in FIG. 16. In response, the central-control device 4 releases the communication path, and attends to a process of handling an end of communication.

Figure 17:
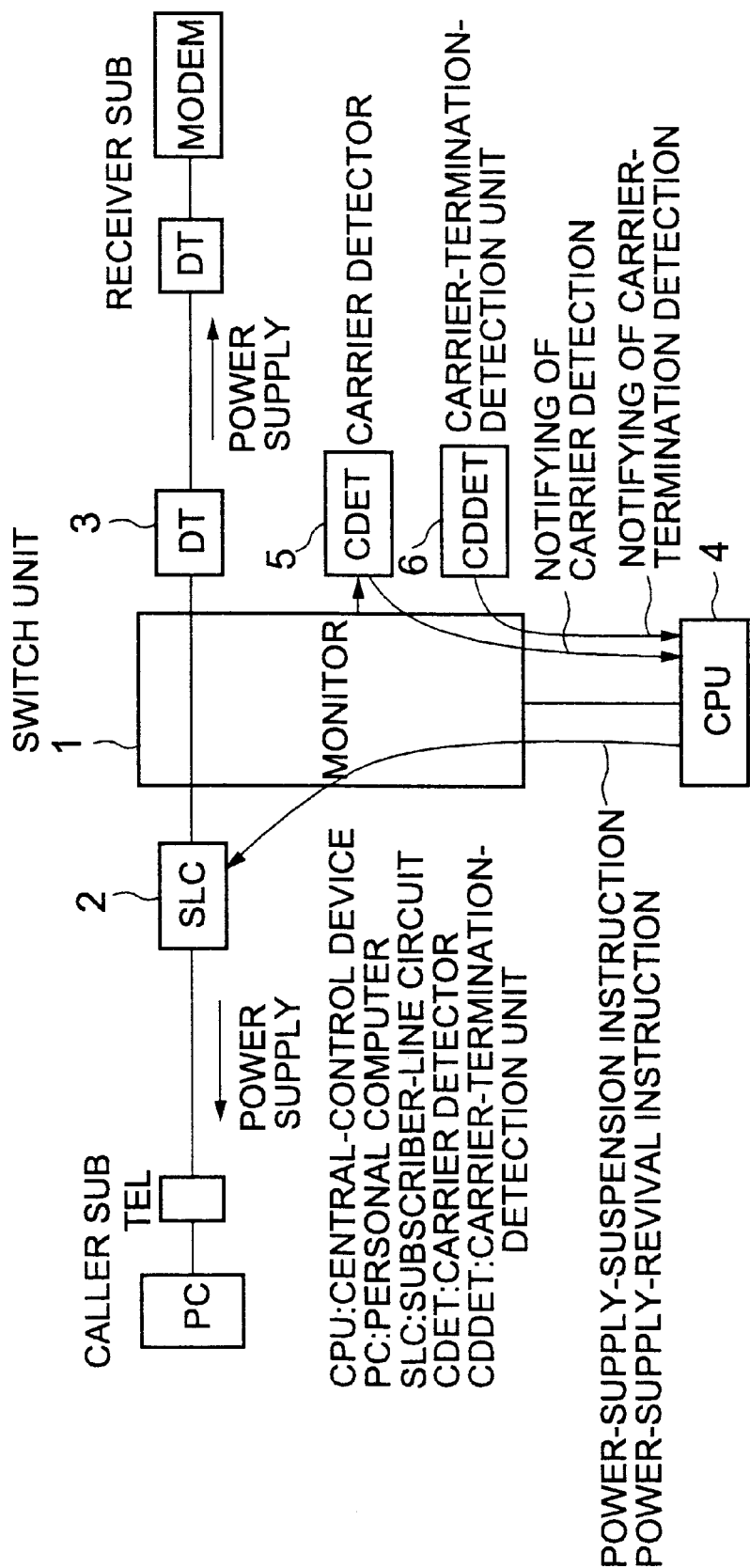
FIG. 17 is a schematic diagram showing a subscriber-switch board according to a second embodiment of the present invention.

FIG. 17 is a schematic diagram showing a subscriber-switch board according to a second embodiment of the present invention. In the first embodiment described above, detection of an end of data communication is made by each of the carrier detectors 5. This adds to the number of carrier detectors 5 that should be provided in the system. Since the carrier detector 5 includes a filter circuit, each carrier detector 5 is rather expensive. Fortunately, however, detection of an end of data communication does not have to be conducted by checking absence of a carrier signal. When the communication is finished, the monitor path is almost silent since the carrier signal is no longer present. Detection of this silent condition, therefore, can serve as a substitute, and can detect an end of communication. The second embodiment is directed to this point, and detects an end of communication at a lower cost than the first embodiment.

As shown in FIG. 17, the second embodiment differs from the first embodiment in that the switch unit 1 is provided with carrier-termination-detection unit 6 for the purpose of detecting an end of communication. The carrier-termination-detection unit 6 detects an end of communication by checking power (power of an alternate current) rather than detecting frequency components of a carrier signal. The number of carrier-termination-detection units 6 is commensurate with the number of data-communication calls. In general, the number of units necessary for detecting an end of data communication is greater than the number of units necessary for detecting data-communication calls (i.e., the number of the carrier-termination-detection units 6 needs to be greater than the number of the carrier detectors 5). Because of this, implementation of the carrier-termination-detection unit 6 by use of a simple circuit structure can greatly reduce the cost of the entire system.

Figure 18:
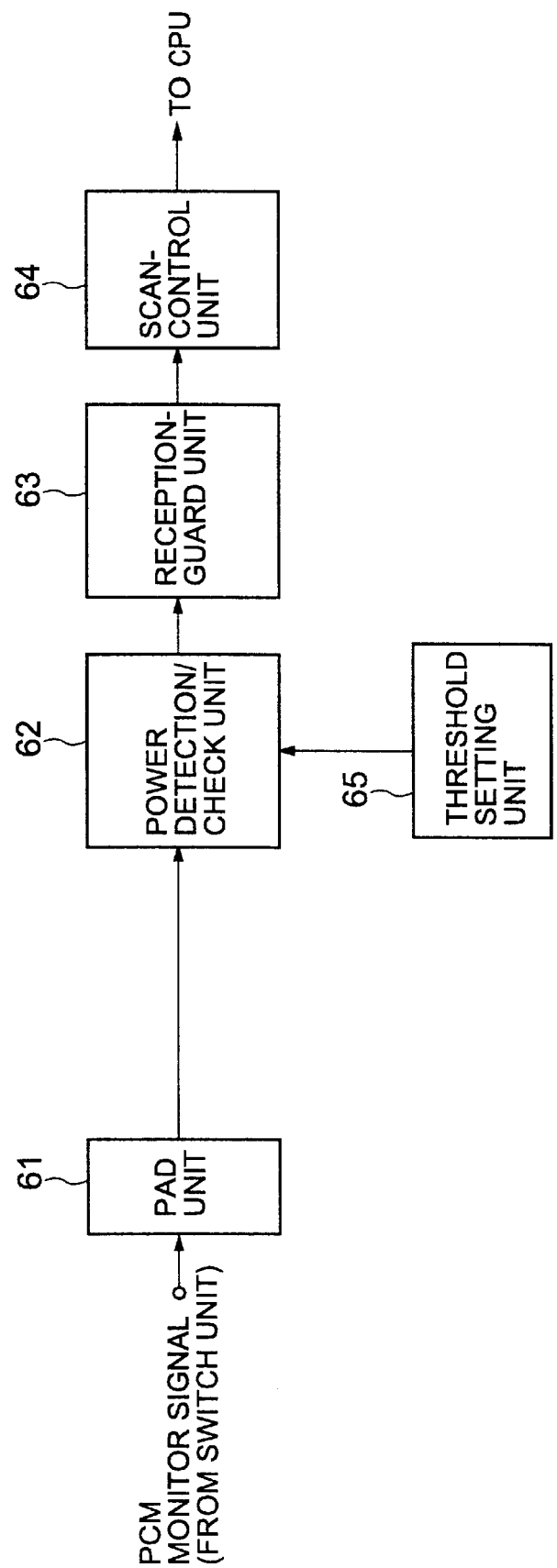
FIG. 18 is a block diagram of a carrier-termination-detection unit.

FIG. 18 is a block diagram of the carrier-termination-detection unit 6. A PAD unit 61 makes a level adjustment to an input monitor signal (PCM signal). A power-detection/check unit 62 obtains a power of an output signal. In detail, the power-detection/check unit 62 obtains the power of an output signal by calculating a sum of squares with respect to an amplitude of the monitor signal (PCM data) over a predetermined time period (e.g., 5 ms), and compares the obtained power with a predetermined threshold (e.g., –25 dBm) supplied from a threshold setting unit 65. If the obtained power is less than the predetermined threshold, it is ascertained, :that there is no carrier signal (i.e., the carrier signal is terminated). A reception-guard unit 63 checks whether a detected power status indicating the termination of a carrier signal is maintained for a predetermined time period (e.g., 20 ms), and informs a SCN-control unit 64 of the termination of the carrier signal only when there is a continuous indication of the absence of the carrier signal during the entirety of this time period. This is intended to provide a safe guard against a faulty detection of the termination of a carrier signal. The SCN-control unit 64 informs the central-control device 4 of the termination of the carrier signal by means of a scan signal.

Figure 19:
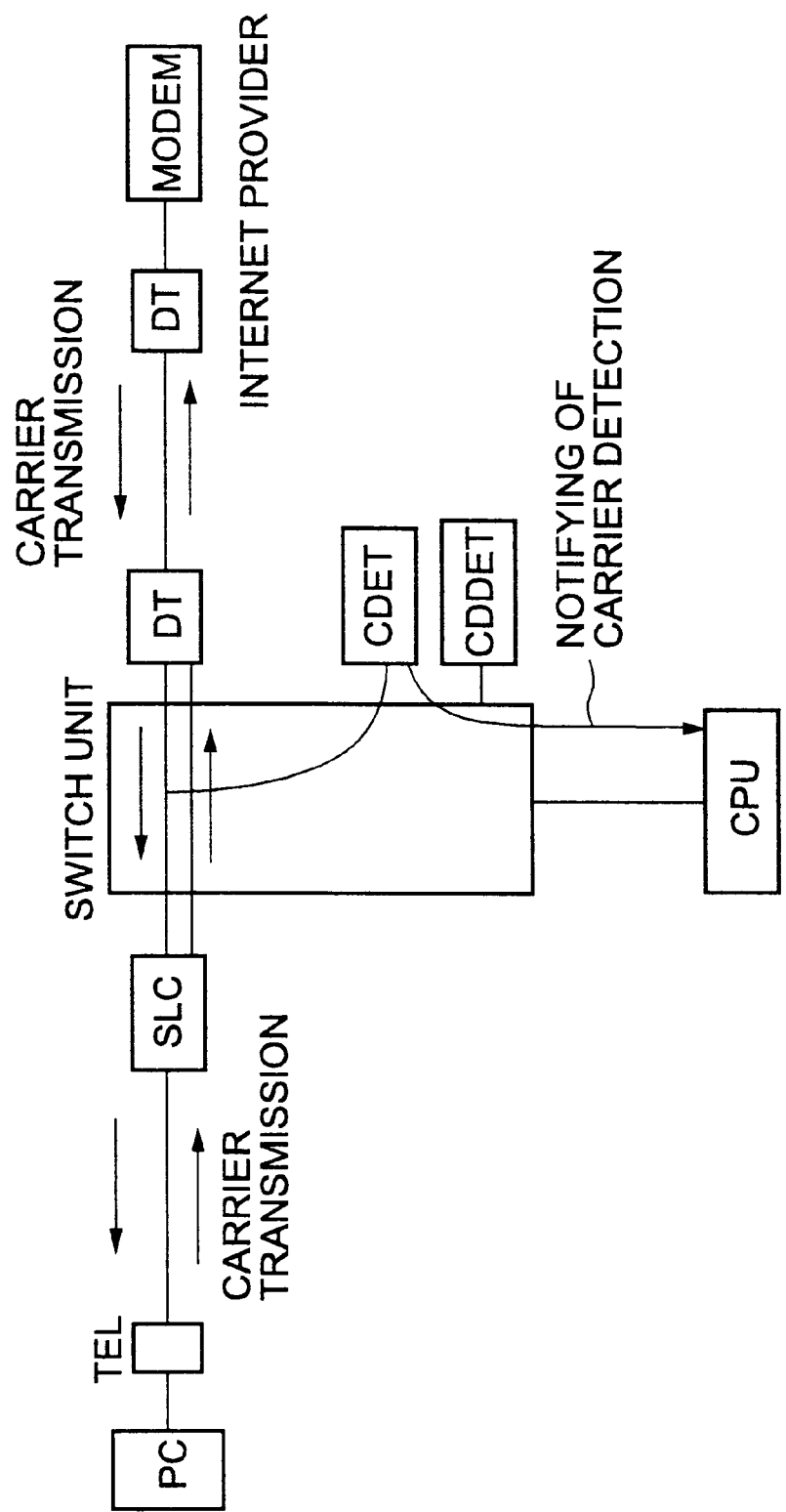
FIG. 19 is an illustrative drawing for explaining operations of the second embodiment.
Figure 20:
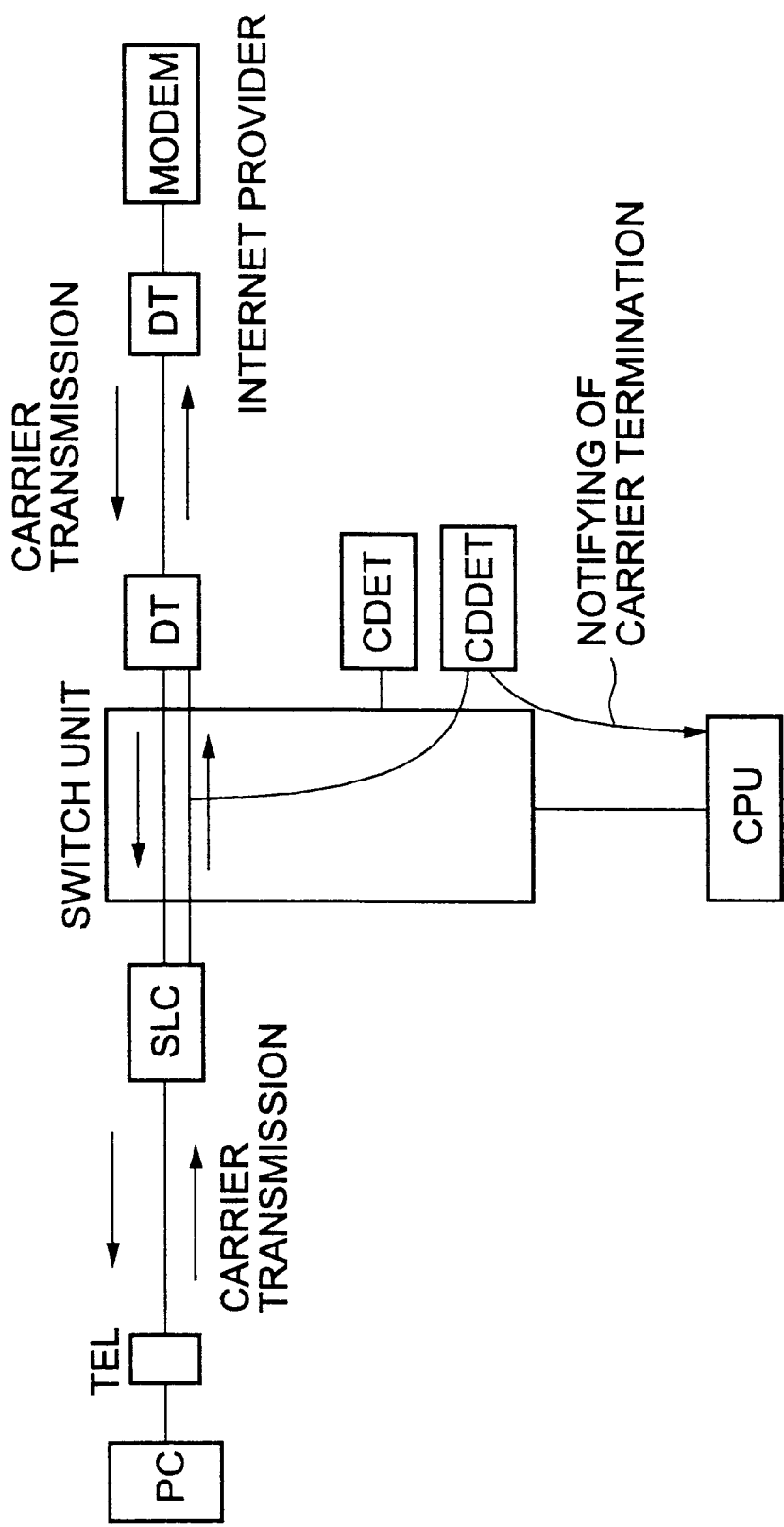
FIG. 20 is an illustrative drawing for explaining operations of the second embodiment.

Operations of the second embodiment will be described with reference to the accompanying drawings. FIGS. 19 and 20 are illustrative drawings, for explaining the operations of the second embodiment. Here, operations from the detection of a data-communication call to the suspension of power supply to a subscriber are the same as those described in connection with the first embodiment with reference to FIGS. 6 through 12. Namely, as shown in FIG. 19, the carrier detector 5 is connected to the receiver-side path after an establishment of a communication path, so that a check is made on a carrier signal to identify a data-communication call. As in the first embodiment, the carrier detector 5 may be connected to the sender-side path, or may be connected to each of the sender-side path and the receiver-side path.

Monitoring of an end of communication, i.e., monitoring of an end of a carrier signal after the carrier detector 5 identified a data-communication call, is carried out as shown in FIG. 20. That is, the carrier-termination-detection unit 6 is connected to the sender-side path at predetermined intervals (e.g., 600 ms) during a communication, and determines whether a carrier signal is present. The central-control device 4 reads a scan signal from the carrier-termination-detection unit 6 so as to learn whether the carrier signal is terminated.

A procedure after the detection of a carrier-signal termination is the same as that described in connection with the first embodiment with reference to FIGS. 14 through 16.

Figure 21:
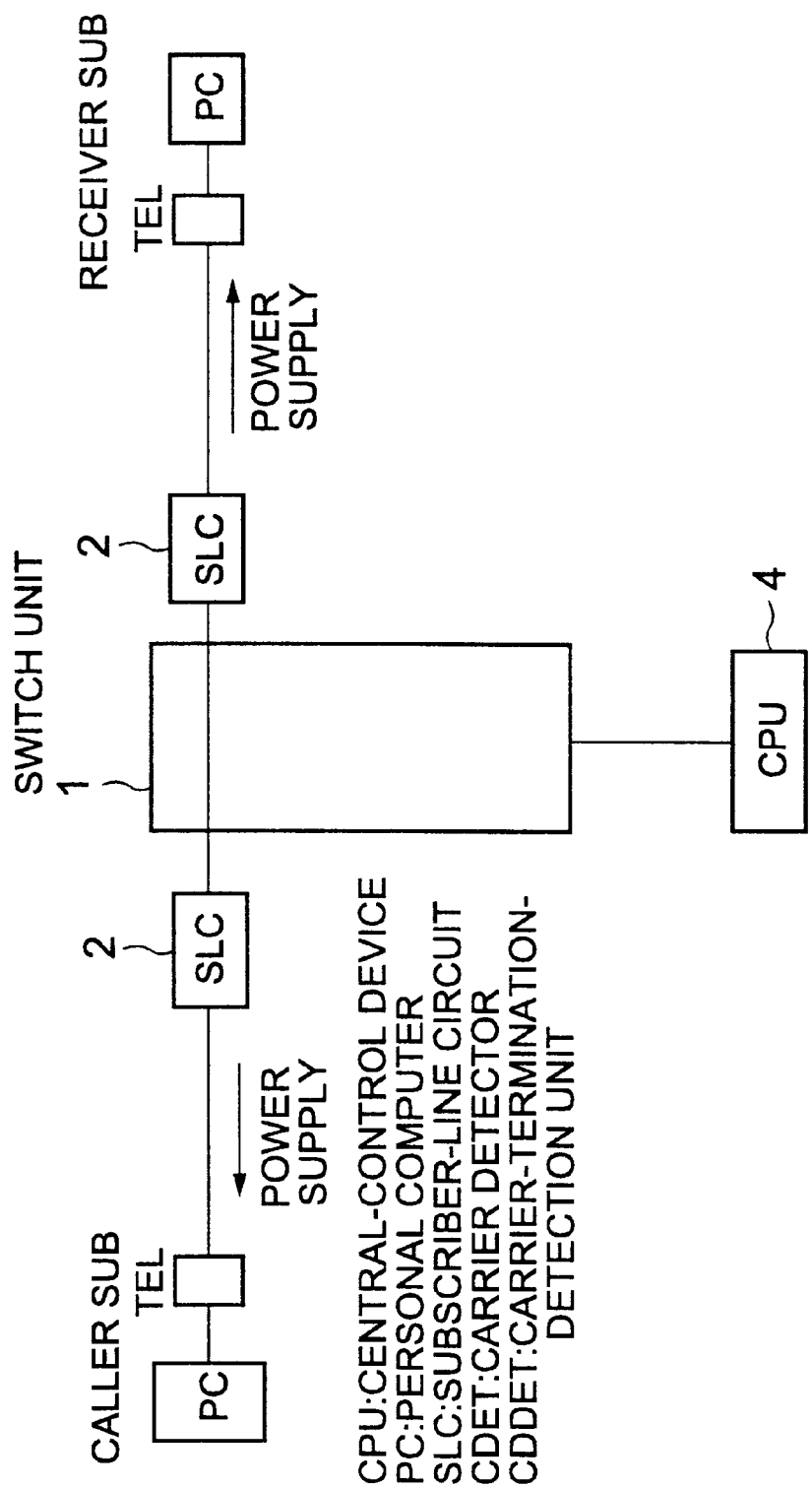
FIG. 21 is a schematic diagram showing a subscriber-switch board provided with a subscriber-line circuit according to a third embodiment of the present invention.

FIG. 21 is a schematic diagram showing a subscriber-switch board provided with a subscriber-line circuit according to a third embodiment of the present invention. In the first and second embodiments, the carrier detector 5 and the carrier-termination-detection unit 6 connected to the switch unit 1 are provided as separate units from the subscriber-line circuit 2. In the third embodiment, on the other hand, the carrier detector 5 and the carrier-termination-detection unit 6 are integrated into the subscriber-line circuit 2, so that detection of a data-communication call, suspension of power supply, and monitoring of an end of communication are carried out within the subscriber-line circuit 2. Because of this configuration, there is no need for the central-control device 4 to perform a special operation for special control, and the central-control device 4 can perform only the same processing as required for ordinary subscribers.

The third embodiment envisions a situation in which the art in the analog-digital-hybrid LSI is highly developed. That is, the third embodiment is based on a premise that the function of a carrier-detetction circuit is integrated by means of a digital-signal processor into the codec function of the subscriber-line circuit without an increase in a manufacturing cost.

Figure 22:
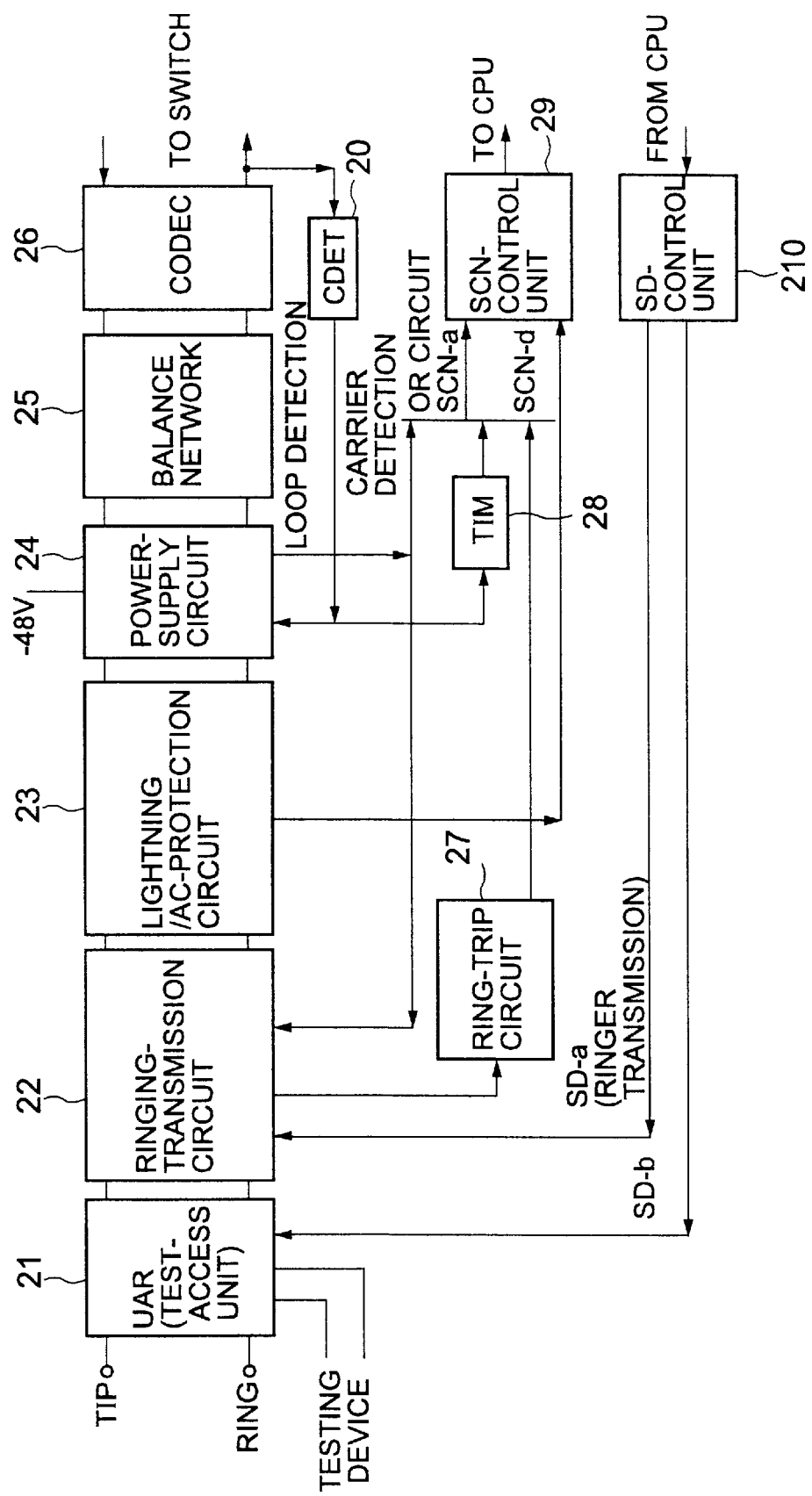
FIG. 22 is a block diagram of a subscriber-line circuit.

FIG. 22 is a block diagram of the subscriber-line circuit 2. Here, the codec function of the subscriber-line circuit 2 is implemented through a digital-signal processor. The subscriber-line circuit 2 of FIG. 22 differs from the subscriber-line circuit 2 of FIG. 3 in that a carrier detector 20 is newly provided for the purpose of monitoring a PCM-commonication signal converted from an analog form into a digital form by the codec 26. A carrier-detection signal from the carrier detector 20 is supplied to the power-supply circuit 24 and the timing circuit 28. The carrier detector 20 is implemented by using a digital-signal processor, so that there is no hardware expansion when the carrier detector 20 is added. In detail, the digital-signal processor performing the function of the codec 26 attends to the function of the carrier detector 20 when resources are available. Namely, the carrier detector 20 is implemented by simply adding programs for carrier-detection processing to existing programs in the digital-signal processor.

Figure 23:
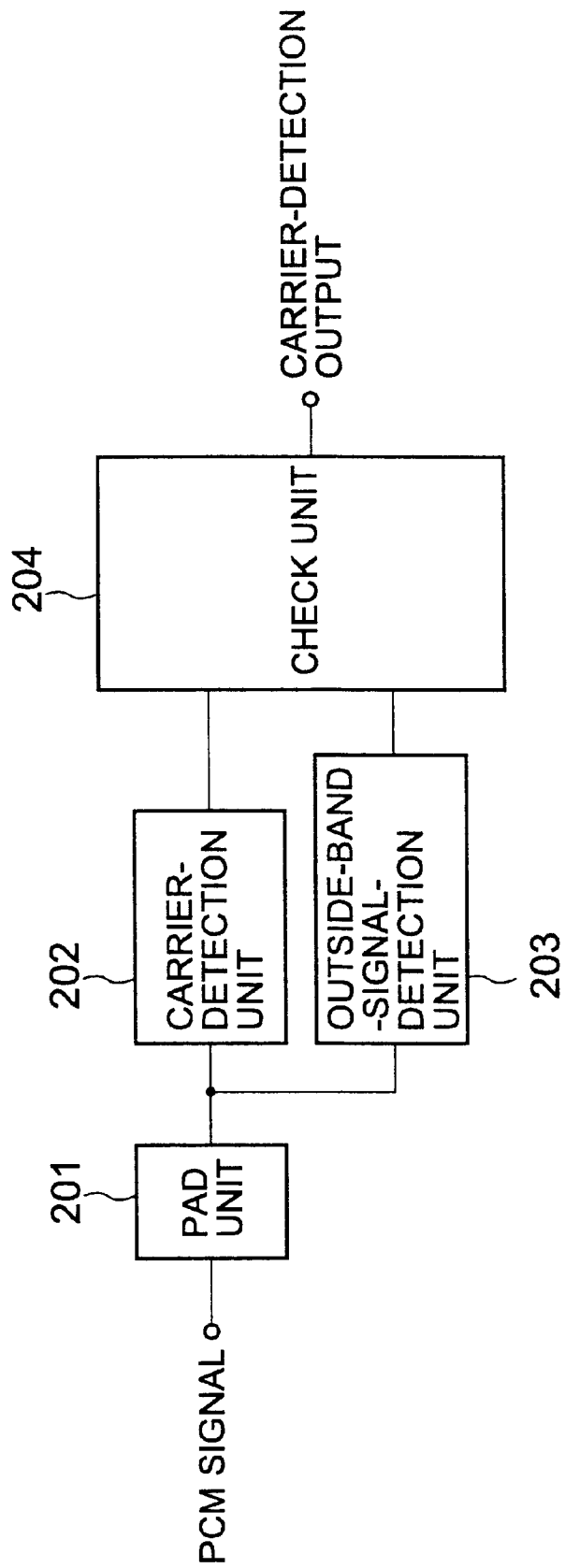
FIG. 23 is a block diagram showing a schematic configuration of a carrier detector integrated into the subscriber-line circuit.

FIG. 23 is a block diagram showing a schematic configuration of the carrier detector 20 integrated into the subscriber-line circuit 2.

As shown in the figure, the PCM signal from the codec 26 is subjected to a level adjustment in a PAD unit 201, and, then, is supplied to a carrier-detection unit 202 and an outside-band-signal-detection unit 203. The carrier-detection unit 202 detects signals falling within a frequency range of a carrier signal (e.g., 1600 Hz through 1800 Hz), and reports a presence of the carrier signal. The outside-band-signal-detection unit 203 detects signals having frequencies outside of the frequency range of the carrier signal, and reports a presence of the out-of-range signals. Outputs of the carrier-detection unit 202 and the outside-band-signal-detection unit 203 are supplied to a check unit 204. The check unit 204 generates a carrier-detection signal indicative of presence of a carrier signal when an output of the carrier-detection unit 202 indicates presence of a carrier, and an output of the outside-band-signal-detection unit 203 indicates absence of out-of-range signals.

The reason whey the detection of out-of-range signals is incorporated along with the detection of a carrier signal is that a safe guard should be put in place in order to avoid confusion of a push-button signal with a carrier signal. A carrier signal of a modem ranges from 1600 Hz through 1800 Hz, and a push-button signal includes a frequency of 1633 Hz on a higher frequency side, so that there is a possibility that the push-button signal is confused with the carrier signal. In order to avoid this confusion, the outside-band-signal-detection unit 203 serves to detect lower frequencies (697 Hz, 770 Hz, 851 Hz, 941 Hz) of the push-button signal, and, when these frequencies are detected, the detected signal is ascertained to be a push-button signal rather than a carrier signal. In such a case, the carrier-detection signal is not generated.

Figure 24:
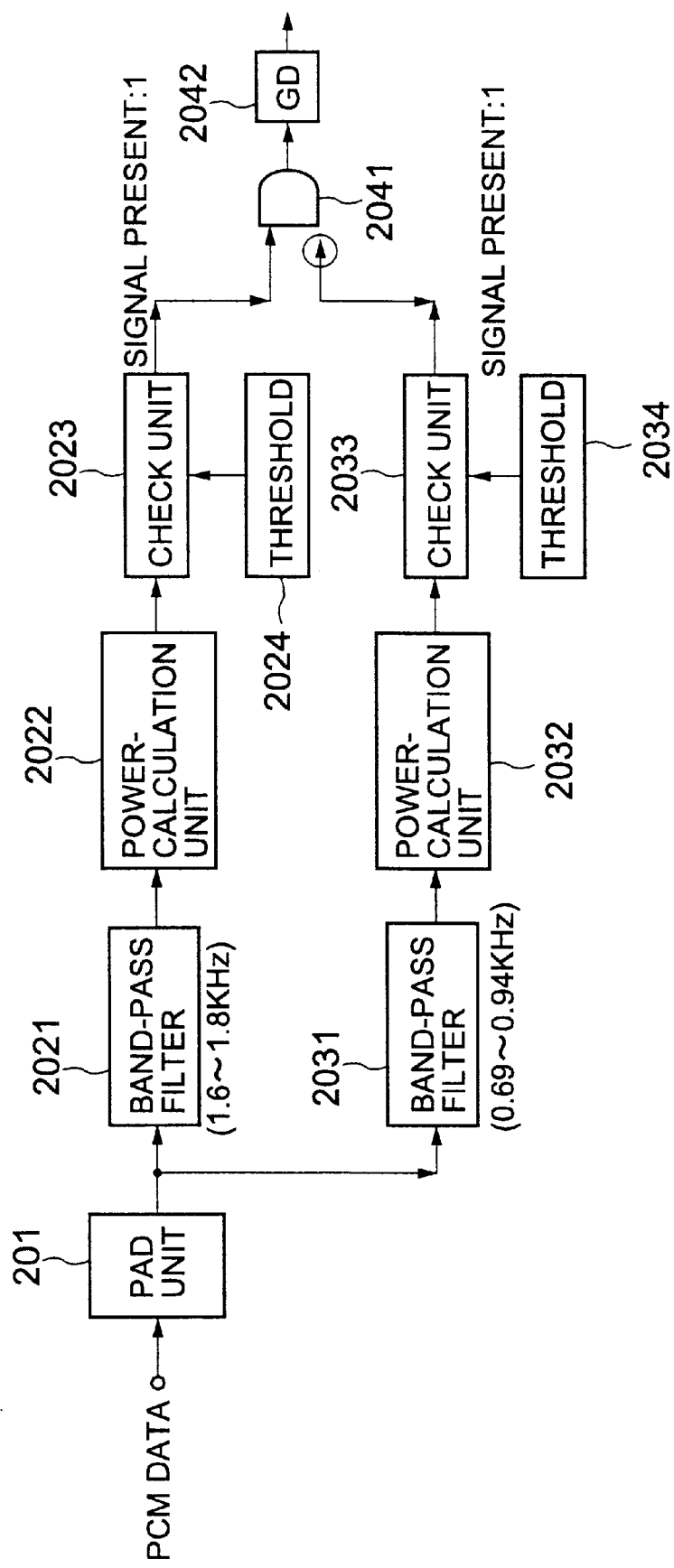
FIG. 24 is a detailed block diagram of the carrier detector.

FIG. 24 is a detailed block diagram of the carrier detector 20. The carrier-detection unit 202 includes a band-pass filter 2021 permitting the passage of signals only with respect to signals having a carrier frequency (i.e., frequency within a range between 1600 Hz and 1800 Hz), a power-calculation unit 2022 obtaining a power of the PCM data passing through the band-pass filter 2021 once in every 50 ms, and a check unit 2023 which compares the power supplied form the power-calculation unit 2022 with a predetermined threshold supplied from a threshold setting unit 2024, and generates a check result indicative of presence of the carrier signal when the obtained power is greater than the predetermined threshold.

The outside-band-signal-detection unit 203 includes a band-pass filter 2031 permitting the passage of signals only with respect to signals having a frequency falling within a range between 690 Hz and 940 Hz, a power-calculation unit 2032 obtaining a power of the PCM data passing through the band-pass filter 2031 once in every 50 ms, and a check unit 2033 which compares the power supplied form the power-calculation unit 2032 with a predetermined threshold supplied from a threshold setting unit 2034, and generates a check result indicative of presence of an out-of-range signal when the obtained power is greater than the predetermined threshold.

The check unit 204 includes a logic circuit 2041 and a guard circuit 2042. The logic circuit 2041 receives respective outputs of the check unit 2023 and the check unit 2033. The logic circuit 2041 generates an output signal indicative of presence of a carrier signal when the check unit 2023 of the carrier-detection unit 202 indicates presence of sufficient power, and the check unit 2033 of the outside-band-signal-detection unit 203 indicates absence of sufficient power. The carrier-detection signal is then subjected to a timing-guard operation in the guard circuit 2042 before being output.

Operations of the third embodiment will be described in the following.

Operations prior to the establishment of paths between the caller and the receiver are the same as those described in connection with the first embodiment with reference to FIGS. 6 through 8.

(1) The carrier detector 20 situated at a stage following the codec 26 monitors PCM data as to whether there is a carrier signal included therein when the PCM data is sent from a subscriber.

(2) When the carrier detector 20 detects a carrier signal, a carrier-detection signal is sent to the power-supply circuit 24 so that the power-supply circuit 24 stops supply of power to the subscriber. At the same time, the carrier-detection signal is supplied to the OR circuit 211 via the timing circuit 28, so that the on-hook-detection signal SCN-a is set to indicate an off-hook state as long as the carrier is detected. This insures that the on-hook-detection signal SCN-a supplied to the SCN-control unit 29 stays indicative of the off-hook state regardless of noises affecting the loop-detection signal supplied from the power-supply circuit 241.

(3) When the carrier detector 20 detects a termination of the carrier signal, the power-supply circuit 24 is notified of this fact so as to resume power supply to the subscriber. Also, the carrier-detection signal supplied to the OR circuit 211 via the timing circuit 28 is kept activated for a predetermined time period (e.g., 50 ms) so as to wait until a loop detection can be made with respect to the subscriber. This insures that the SCN-control unit 29 is informed of presence of the carrier signal until a loop detection becomes available.

(4) When the loop of the subscriber is disconnected, the communication path is released.

As described above, the present invention can tolerate an increase in the number of internet calls or the like without increasing the capacity of power supply to subscribers, thereby eliminating a need for increasing the power-supply capacity in the switch board. Further, the present invention can reduce day-to-day power consumption adding to the operation costs of the switch system.

Further, the present invention is not limited to these embodiments, but various variations and modifications may be made without departing from the scope of the present invention.

What is claimed is:

1. A device for controlling power supply to subscribers in a digital subscriber-switch board, comprising:
    subscriber-line circuits which supply power to said subscribers; and
    a carrier-detection unit which is connected to a communication path to detect a carrier signal of a modem once said communication path is established between a caller and a receiver, said caller being one of said subscribers,
    wherein one of said subscriber-line circuits corresponding to said one of said subscribers is controlled to suspend power supply to said one of said subscribers when said carrier-detection unit detects said carrier signal on said communication path.

2. The device as claimed in claim 1, wherein said carrier-detection unit continues to monitor said carrier signal on said communication path after the suspension of said power supply, and said one of said subscriber-line circuits is controlled to resume power supply to said one of said subscribers when said carrier-detection unit detects a termination of said carrier signal, the resumed power supply being used for monitoring an end of a call between said caller and said receiver.

3. The device as claimed in claim 1, further comprising a signal-termination-detection unit which checks whether a signal power is present in said communication path after the suspension of said power supply, wherein said one of said subscriber-line circuits is controlled to resume power supply to said one of said subscribers when said signal-termination-detection unit finds no signal power, the resumed power supply being used for monitoring an end of a call between said caller and said receiver.

4. The device as claimed in claim 1, further comprising a central-control unit which is informed of a presence of said carrier signal by said carrier-detection unit, and controls said one of said subscriber-line circuits to suspend power supply to said corresponding one of said subscribers.

5. The device as claimed in claim 2, further comprising a central-control unit which is informed of absence of said carrier signal by said carrier-detection unit, and controls said one of said subscriber-line circuits to resume power supply to said corresponding one of said subscribers.

6. The device as claimed in claim 1, further comprising a central-control unit which is informed of absence of said signal power by said signal-termination-detection unit, and controls said one of said subscriber-line circuits to resume power supply to said corresponding one of said subscribers.

7. The device as claimed in claim 4, wherein said communication path to which said carrier-detection unit is connected is a communication path on a receiver side.

8. The device as claimed in claim 1, wherein said carrier-detection unit includes:
    a carrier-signal-detection unit which checks whether a signal is present within a range of carrier frequencies;
    an outside-band-signal-detection unit which checks whether a signal is present outside said range of carrier frequencies;
    a check unit which detects a presence of said carrier signal when said carrier-signal-detection unit detects a presence of a signal within said range of carrier frequencies and said outside-band-signal-detection unit finds no signal outside said range of carrier frequencies,
    wherein said communication path to which said carrier-detection unit is connected is a communication path on a caller side.

9. The device as claimed in claim 2 or 3, wherein said one of said subscriber-line circuits nullifies an on-hook-detection function thereof for at least a period during which said power supply is suspended.

10. The device as claimed in claim 2 or 3, wherein said one of said subscriber-line circuits nullifies an on-hook-detection function thereof for a predetermined time period following a revival of said power supply.

11. A subscriber-line circuit used in a digital subscriber-switch board and supplying power to a subscriber, comprising:
    a carrier-detection unit which looks for a carrier signal of a modem on a communication path once said communication path is established through said subscriber-line circuit between a caller and a receiver, said caller being said subscriber,
    wherein the power supply to said subscriber is suspended when said carrier-detection unit detects said carrier signal on said communication path.

12. The subscriber-line circuit as claimed in claim 11, wherein said carrier-detection unit monitors said carrier signal on said communication path after the suspension of said power supply, and said power supply is resumed when said carrier-detection unit detects a termination of said carrier signal, the resumed power supply being used for monitoring an end of a call between said caller and said receiver.

13. The subscriber-line circuit as claimed in claim 11, wherein said carrier-detection unit comprises a digital signal processor.

14. The subscriber-line circuit as claimed in claim 11, wherein said carrier-detection unit includes:
    a carrier-signal-detection unit which checks whether a signal is present within a range of carrier frequencies;
    an outside-band-signal-detection unit which checks whether a signal is present outside said range of carrier frequencies;
    a check unit which detects a presence of said carrier signal when said carrier-signal-detection unit detects a presence of a signal within said range of carrier frequencies and said outside-band-signal-detection unit finds no signal outside said range of carrier frequencies.

15. The subscriber-line circuit as claimed in claim 11, wherein an on-hook-detection function thereof is nullified for at least a period during-which said power supply is suspended.

16. The subscriber-line circuit as claimed in claim 11, wherein an on-hook-detection function thereof is nullified for a predetermined time period following a revival of said power supply.

* * * * *